US010642572B2

(12) United States Patent
Willis et al.

(10) Patent No.: US 10,642,572 B2
(45) Date of Patent: May 5, 2020

(54) AUDIO SYSTEM

(71) Applicant: Human, Incorporated, Seattle, WA (US)

(72) Inventors: Benjamin S. Willis, Bellevue, WA (US); Joseph David Dieter, Seattle, WA (US); Gelmont Rios, Seattle, WA (US); Stephen John Minarsch, Seattle, WA (US); Kyle Marcolini, Seattle, WA (US); Adam Abraham Jossem, Seattle, WA (US); Eliza Arango Vargas, Redmond, WA (US)

(73) Assignee: Human, Incorporated, Seattle, WA (US)

( * ) Notice: Subject to any disclaimer, the term of this patent is extended or adjusted under 35 U.S.C. 154(b) by 0 days.

(21) Appl. No.: 16/095,657

(22) PCT Filed: Apr. 21, 2017

(86) PCT No.: PCT/US2017/028967
§ 371 (c)(1),
(2) Date: Oct. 22, 2018

(87) PCT Pub. No.: WO2017/185046
PCT Pub. Date: Oct. 26, 2017

(65) Prior Publication Data
US 2019/0129684 A1 May 2, 2019

Related U.S. Application Data

(60) Provisional application No. 62/395,305, filed on Sep. 15, 2016, provisional application No. 62/325,904, filed on Apr. 21, 2016.

(51) Int. Cl.
*G06F 3/16* (2006.01)
*H04R 1/10* (2006.01)
(Continued)

(52) U.S. Cl.
CPC .............. *G06F 3/165* (2013.01); *G06F 1/16* (2013.01); *H04M 1/035* (2013.01);
(Continued)

(58) Field of Classification Search
CPC .......... G06F 3/165; G06F 1/16; H04M 1/035; H04M 1/7253; H04M 1/72558;
(Continued)

(56) References Cited

U.S. PATENT DOCUMENTS

| 4,991,219 A | 2/1991 | Isenhath |
| 2007/0281744 A1 | 12/2007 | Andreasson |

(Continued)

OTHER PUBLICATIONS

International Search Report and Written Opinion of the International Searching Authority, for International Application No. PCT/US2017/028967, dated Aug. 24, 2017; 11 pages.

*Primary Examiner* — Andrew L Sniezek
(74) *Attorney, Agent, or Firm* — Seed IP Law Group LLP

(57) ABSTRACT

Various embodiments provide for an audio system and methods for facilitating a group-listening user experience. A first audio device and a second audio device may each include at least one speaker. The first audio device and the second audio device may be selectively coupled to each other via one or more coupling devices. In such embodiments, the respective speaker or speakers of each of the first and second audio devices may be configured to direct sound into the at least partial acoustic chamber formed by the first and second audio devices. The at least partial acoustic chamber may be configured to have a shape that is suitable for mixing, combining, blending, acoustically amplifying, and/or directing the sound from the speakers of the first and second audio devices in a direction that is away from the audio system.

17 Claims, 14 Drawing Sheets

(51) Int. Cl.
*H04M 1/03* (2006.01)
*G06F 1/16* (2006.01)
*H04R 5/02* (2006.01)
*H04M 1/725* (2006.01)
*H04R 1/28* (2006.01)
*H04R 1/02* (2006.01)
*H04R 27/00* (2006.01)

(52) U.S. Cl.
CPC ........ *H04M 1/7253* (2013.01); *H04R 1/1008* (2013.01); *H04R 1/1041* (2013.01); *H04R 5/02* (2013.01); *H04M 1/72558* (2013.01); *H04R 1/026* (2013.01); *H04R 1/2811* (2013.01); *H04R 27/00* (2013.01); *H04R 2205/024* (2013.01); *H04R 2227/005* (2013.01); *H04R 2420/07* (2013.01); *H04R 2430/01* (2013.01)

(58) Field of Classification Search
CPC ...... H04R 1/1008; H04R 1/1041; H04R 5/02; H04R 1/026; H04R 1/2811; H04R 27/00; H04R 2205/024; H04R 2227/005; H04R 2420/07; H04R 2430/01
See application file for complete search history.

(56) References Cited

U.S. PATENT DOCUMENTS

| | | | |
|---|---|---|---|
| 2010/0111349 A1* | 5/2010 | Devlas | H04R 1/1033 381/380 |
| 2012/0099751 A1 | 4/2012 | Hampton et al. | |
| 2012/0189136 A1* | 7/2012 | Brown | H04R 1/1041 381/74 |
| 2013/0114816 A1 | 5/2013 | Lee et al. | |
| 2013/0121494 A1* | 5/2013 | Johnston | H04R 1/1041 381/56 |
| 2013/0136289 A1 | 5/2013 | Goel et al. | |
| 2017/0289328 A1* | 10/2017 | McGregor | H04M 1/05 |

* cited by examiner

AUDIO SYSTEM

RELATED APPLICATIONS

This application claims the benefit of priority to U.S. Provisional Application No. 62/325,904 entitled "HEAD-WORN AUDIO SYSTEM," filed on Apr. 21, 2016; and U.S. Provisional Application No. 62/395,305 entitled "AUDIO SYSTEM," filed on Sep. 15, 2016, the entire contents of all of the foregoing hereby incorporated by reference.

BACKGROUND

Some audio systems—such as headphones—include speaker elements that are worn close to users' ears. As a result, these speaker elements may output audio at a comparatively low volume that may enable users wearing such audio systems to enjoy media without disturbing others close by. For users that desire to listen to audio with one or more other users, some audio systems include speaker elements that are configured to output audio at a volume that may be heard by a group of nearby users (e.g., in the same room). However, current audio systems typically are not configured to operate selectively as both a personal-listening system (e.g., headphones) and as a group-listening system (e.g., a public-address system). As a result, a user may need to utilize one audio system for personal listening and a second, separate audio system for group listening.

SUMMARY

Various embodiments provide for a first audio device that includes a first speaker, a second speaker, a first sealing body, and a cover body coupled to the first sealing body. In some embodiments, the first sealing body may be configured to couple to a second sealing body of a second audio device to form an at least partial acoustic chamber between the first audio device and the second audio device. In some embodiments, the second speaker may utilize the at least partial acoustic chamber to generate sound while the first sealing body is coupled to the second sealing body.

In some embodiments, the first speaker may be configured as a personal-listening speaker and the second speaker may be configured as a group-listening speaker. A frontward side of the second speaker may be configured to face the at least partial acoustic chamber. In some embodiments, the at least partial acoustic chamber encapsulates a front volume of air utilized by the second speaker to generate sound, and the second speaker may be configured to output the sound in a direction towards the at least partial acoustic chamber.

In some embodiments, a rearward side of the second speaker may be configured to face the at least partial acoustic chamber. In such embodiments, the first audio device may also include an acoustic port configured to acoustically couple the rearward side of the second speaker with the at least partial acoustic chamber. In some embodiments, the at least partial acoustic chamber may encapsulate a back volume of air utilized by the second speaker to generate sound, and the second speaker may be configured to output the sound in a direction away from the at least partial acoustic chamber. In some embodiments, the first sealing body may be coupled to the second sealing body, and the at least partial acoustic chamber may be configured to at least one of direct, blend, or amplify the sound generated by the second speaker. In some embodiments, the at least partial acoustic chamber may be configured to blend sound generated by the second speaker with sound generated by at least one speaker included in the second audio device, while the first sealing body is coupled to the second sealing body.

In some embodiments, when the first audio device is not coupled to the second audio device, the sealing body may be configured to define a chamber suitable for accommodating a majority of an ear of a user. The cover body may include a mid-ear portion configured to protrude into the at least partial acoustic chamber, and the first speaker may be one of embedded in or coupled to the mid-ear portion. The first sealing body may include a first coupling device, and the first sealing body may be configured to couple to the second sealing body when the first coupling device couples to a second coupling device included in the second sealing body. In such embodiments, the first coupling device may be one of a magnet, an interlocking device, or a fastener.

In some embodiments, the first audio device may also include a processing unit. The first speaker may be configured as a personal listening speaker and the second speaker may be configured as group-listening speaker, and the processing unit may be configured to cause the first speaker to deactivate in response to determining that the first sealing body has been coupled to the second sealing body and to cause the first speaker to activate in response to determining that the first sealing body has decoupled from the second sealing body. In some embodiments, the processing unit may be configured to cause the second speaker to activate in response to coupling the first sealing body to the second sealing body and to cause the second speaker to deactivate in response to decoupling the first sealing body from the second sealing body.

In some embodiments, the cover body may include a touch input device. The first sealing body may be configured to form a gap between the first sealing body and the second sealing body while the first sealing body is coupled to the second sealing body such that the at least partial acoustic chamber is not air tight. The at least partial acoustic chamber may be air tight.

In some embodiments, the first audio device may include a grooved portion formed between the cover body and the first sealing body. In such embodiments, the grooved portion may include at least one acoustic port. The grooved portion may include at least one lighting element. In some embodiments, an angle of attachment between the first audio device and the second audio device may be (at least substantially) equal to 180 degrees.

In some embodiments, the first sealing body may include an anterior portion and a posterior portion, and the at least partial acoustic chamber may be formed when the anterior portion is coupled to the second sealing body and the posterior portion is not coupled to the second sealing body. In some embodiments, while the first audio device is coupled to the second audio device, the first speaker may be configured in an orientation such that sound generated by the first speaker is projected in a direction that intersects with a direction in which sound is played out from a second speaker of the second audio device. In some embodiments, while the first audio device is coupled to the second audio device, the first speaker may be configured to generate sound that is projected towards an acoustic convergence zone such that the sound generated by the first speaker at least one of mixes, blends, or interferes with sound generated by a second speaker of the second audio device. In some embodiments, the first audio device may also include a transceiver configured to communicate with at least one of the second audio device or a base device.

In some embodiments, the first audio device may also include a first sensor configured to determine that the first audio device is coupled to one of a second audio device or a base device. In such embodiments, the first audio device may also include a second sensor configured to determine that the first audio device is secured to the user, and the second sensor may be distinct from the first sensor. In some embodiments, the first sensor may be a magnetic sensor and the second sensor may be a capacitance sensor.

Various other embodiments provide for a system that includes a first audio device and a second audio device. In some embodiments, the first audio device may include a first speaker, a second speaker, a first sealing body, and a first cover body coupled to the first sealing body. The second audio device may include a third speaker, a fourth speaker, a second sealing body, and a second cover body coupled to the second sealing body. In such embodiments, the first sealing body and the second sealing body may be configured to couple together to form an at least partial acoustic chamber between the first audio device and the second audio device, and at least two of the first speaker, second speaker, third speaker, and fourth speaker may utilize the at least partial acoustic chamber to generate sound. In some embodiments, the system also includes a base device configured to couple to at least one of the first audio device and the second audio device.

In some embodiments, the first speaker may be configured as a personal-listening speaker and the second speaker may be configured as a group-listening speaker. In some embodiments, a frontward side of the second speaker may be configured to face the at least partial acoustic chamber, and a frontward side of the fourth speaker may be configured to face the at least partial acoustic chamber. In some embodiments, the at least partial acoustic chamber may include a front volume of air utilized by the second speaker and the fourth speaker to generate sound, and the second speaker and the fourth speaker may be configured to output the sound in a direction towards the at least partial acoustic chamber.

In some embodiments, a rearward side of the second speaker may be configured to face the at least partial acoustic chamber, and a rearward side of the fourth speaker may be configured to face the at least partial acoustic chamber. In such embodiments, the system may also include an acoustic port configured to acoustically couple the rearward side of the second speaker with the at least partial acoustic chamber. In some embodiments, the at least partial acoustic chamber may include a back volume of air utilized by the second speaker and the fourth speaker to generate sound, and the second speaker and the fourth speaker may be configured to output the sound in a direction away from the at least partial acoustic chamber. In some embodiments, while the first sealing body is coupled to the second sealing body, the at least partial acoustic chamber may be configured to at least one of direct, blend, or amplify the sound generated by the second speaker. In such embodiments, the at least partial acoustic chamber may be configured to blend first sound generated by the second speaker with second sound generated by the fourth speaker.

Various embodiments provide for a computer-implemented method implemented on a first audio device usable in conjunction with a second audio device.

In some embodiments, the method may include determining that the first audio device is not secured to a user, determining that the second audio device is not secured to the user, determining that the first audio device is coupled to one of the second audio device or a base device, and causing at least the first audio device to enable a group-listening mode. In some embodiments, determining that the second audio device is not secured to a user may include sending a communication to the second audio device requesting information regarding whether the second audio device is secured to the user, obtaining the information, and determining that the second audio device is not secured to the user based on the information. In some embodiments, the information may include sensor information obtained by one or more sensors included on the second audio device and/or a determination that the second audio device is not coupled to the user.

In some embodiments, the method may also include determining that the first audio device has been decoupled from one of the second audio device or the base device, and causing the first audio device to disable the group-listening mode. In some embodiments, the method may also include causing a computing device to enable a group-listening mode in response to determining that the first audio device is coupled to one of the second audio device or the base device. In some embodiments, the method may also include determining that the first audio device is no longer coupled to one of the second audio device or the base device, determining that a threshold period of time has elapsed from a time at which a group-listening mode was enabled on the first audio device, and causing the first audio device to transition from an active mode to a standby mode. In some embodiments, causing at least the first audio device to enable a group-listening mode includes causing a group-listening speaker to activate. In some embodiments, causing at least the first audio device to enable a group-listening mode may include causing a speaker to transition from a personal-listening mode to a group-listening mode.

Various embodiments provide for a non-transitory, computer-readable medium having stored thereon computer-executable software instructions configured to cause a processor of a computing device to perform any operations of the method described above. Various embodiments provide for a system that includes a first audio device and a second device, and the first audio device may include a memory configured to store processor-executable instructions and a processor and may be configured to execute the processor-executable instructions to perform operations of the method described above. Various embodiments provide for a first audio device that may include a memory configured to store processor-executable instructions and a processor in communication with the memory and configured to execute the processor-executable instructions to perform the operations of the method described above. Various embodiments provide for an audio device comprising means for performing any of operations of the method described above.

Various embodiments provide for an audio system that may include a pair of audio devices each configured to be attached to and supported by a respective ear of a user and being coupleable together to collectively form an at least partial acoustic chamber. In such embodiments, each audio device may include at least one speaker operable as a group-listening speaker that is arranged to utilize the at least partial acoustic chamber to modify sound emitted therefrom. In some embodiments, each audio device may include a speaker operable as a personal-listening speaker that is distinct from the speaker operable as the group-listening speaker. In some embodiments, for each audio device, a frontward side of the at least one speaker operable as the group-listening speaker may be arranged to face the at least partial acoustic chamber. In some embodiments, for each audio device, the at least one speaker operable as the group-listening speaker may be arranged to output sound in a direction towards a front volume of air within the at least partial acoustic chamber.

In some embodiments, for each audio device, a rearward side of the at least one speaker operable as the group-listening speaker may be arranged to face the at least partial acoustic chamber. In such embodiments, each audio device may also include an acoustic port configured to acoustically couple the rearward side of the at least one speaker operable as the group-listening speaker with the at least partial acoustic chamber. In some embodiments, for each audio device, the at least one speaker operable as the group-listening speaker may be arranged to output sound in a direction away from a back volume of air within the at least partial acoustic chamber.

In some embodiments, the at least partial acoustic chamber collectively defined by the audio devices when coupled together may be configured to at least one of direct, blend, or amplify sound generated by the at least one speaker operable as the group-listening speaker of each audio device. In some embodiments, each audio device may include at least one coupling device for removably coupling the audio devices together. In some embodiments, each audio device may include a processing unit that may be configured to cause the at least one speaker operable as the group-listening speaker to activate in response to coupling of the audio devices together and to deactivate in response to decoupling of the audio devices.

In some embodiments, the at least partial acoustic chamber may not be air tight. In some embodiments, the at least partial acoustic chamber may be air tight. In some embodiments, each audio device may include at least one acoustic port in a periphery thereof through which sound generated within the audio device exits the audio device. In some embodiments, the audio devices may be coupleable face-to-face to collectively form the at least partial acoustic chamber. In some embodiments, the audio devices may be coupleable together at an acute angle to collectively form the at least partial acoustic chamber. In some embodiments, the audio system may also include one or more sensors configured to determine that the audio devices are coupled to each other or a separate base device. In some embodiments, the audio system may also include one or more sensors configured to determine that the audio devices are secured to a user's ears. In some embodiments, the audio system may also include a base device configured to support the audio devices and modify sound emanating from the audio devices when the audio devices are coupled thereto and generating sound.

BRIEF DESCRIPTION OF THE DRAWINGS

The foregoing embodiments and many of the attendant advantages will become more readily appreciated as the same become better understood by reference to the following detailed description, when taken in conjunction with the accompanying drawings, wherein.

DETAILED DESCRIPTION

Figure 1A:
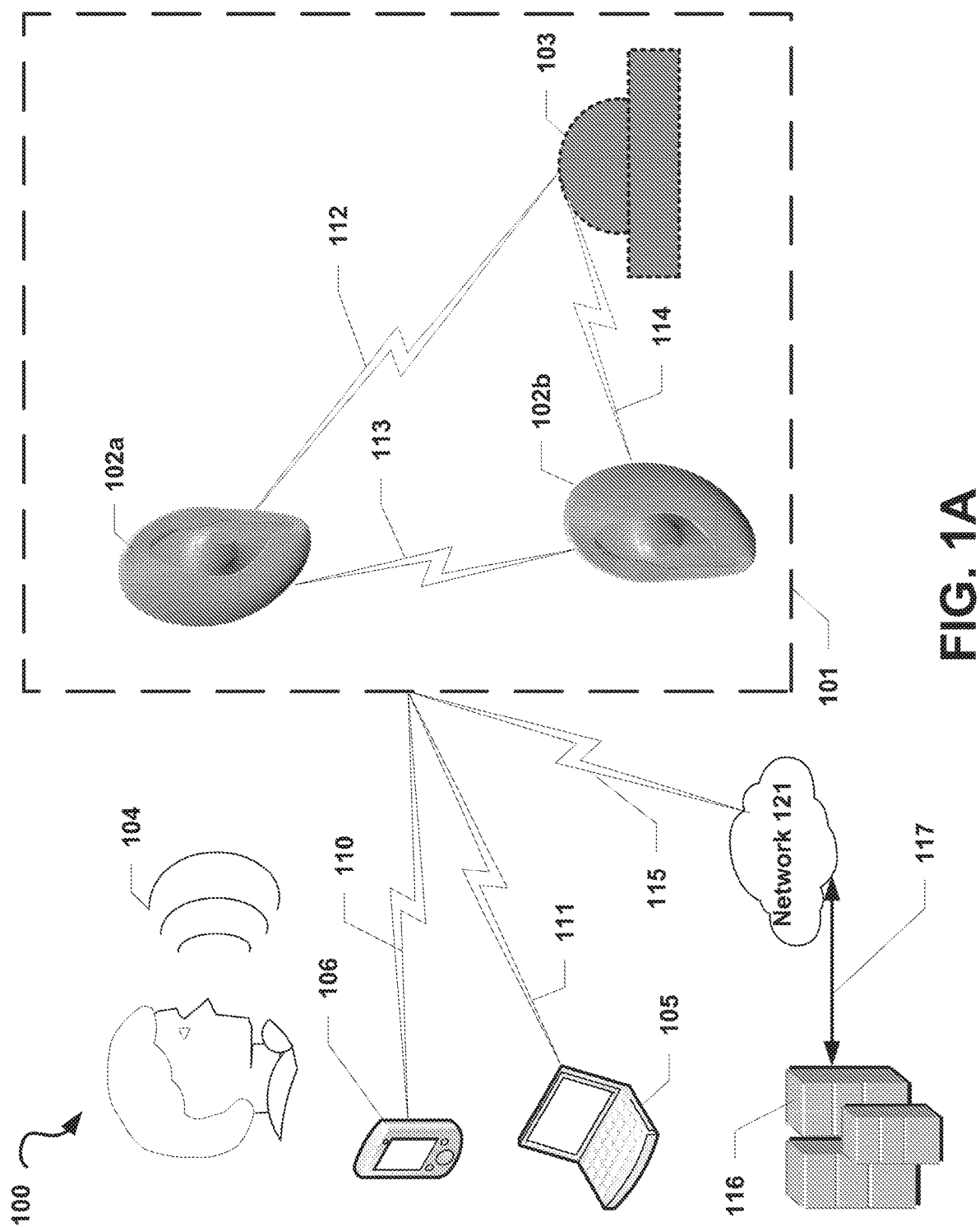
FIG. 1A is a communication system diagram illustrating an audio system, according to some embodiments.

Various embodiments of the attachment apparatus may be described with reference to certain anatomical features of a human user's ear. For ease of reference, the anatomical features of a user's ear may be referred to in this disclosure using the following terms. The term "root of an ear" refers to a portion of the ear that is proximal to the user's head. Specifically, the root of a user's ear may be a portion or structure of the ear that secures the ear to the user's head. Also, as used herein, the term "outer ear" refers to the portion of the ear that is distal to the user's head as compared to the root of the ear. The outer ear may include or otherwise be defined by at least a portion of the ear's auricle, helix, and/or lobule. Typically, the perimeter of the outer ear of an ear is greater than the perimeter of the root of the ear. Further, the terms "front of an ear" and "anterior portion of an ear" are used interchangeably and refer to a portion of the ear that is proximal to a user's face and distal to the back of the user's head. The front of the ear may include portions of the helix, the antihelix, tragus, and antitragus that are proximal to the user's face. The terms "back of an ear" and "posterior portion of an ear" are used interchangeably and refer to a portion of the ear that is proximal to the back of the user's head and distal to the user's face. The back of the ear may include portions of the helix and the antihelix proximal to the back of the user's head. The term "interior portion of an ear" refers to a portion of the outer ear proximal to, but not including, the ear canal. The interior portion of an ear may include, without limitation, at least part of one or more of the concha, anti-helix, anti-tragus, and tragus. Further descriptions and references to the foregoing terms are provided herein.

As used herein, the terms "speaker" or "loud speaker" are used interchangeably and generally refers to an electroacoustic transducer that is configured to convert an electrical signal into audible sound. The term "personal-listening speaker" refers to a speaker that is configured to play out audio at a volume that is suitable for use as a personal listening device. By way of a non-limiting example, a personal-listening speaker may be included in headphone or earphone devices configured to output audio close to a user's ear without damaging the user's hearing. The term "group-listening speaker" refers to a speaker that is configured to output audio at a volume that is suitable for use as a group-listening device. In a non-limiting example, a group-listening speaker may be included in a portable loud speaker, such as a portable Bluetooth® speaker, and may be configured to play out audio having a volume that is audible to a group of individuals close to the group-listening speaker. As used herein, the term "back volume" generally refers to a volume of air on a rearward-facing side of a speaker driver, and the term "front volume" generally refers to another volume of air on a frontward-facing side of a speaker driver, as would be known by one of ordinary skill in the art.

In overview, aspects of the present disclosure include audio systems that feature improvements over current audio systems, such as those described above. Specifically, in some embodiments, an audio system may include a first audio device and a second audio device. The first audio device and the second audio device may each include at least one speaker. The first audio device and the second audio device may be selectively coupled to each other via one or more coupling devices (e.g., interlocking components, magnets, or the like). While coupled together, the first audio device and the second audio device may collectively form/define at least a partial acoustic chamber. In this configuration, each of the first audio device and the second audio device may collectively utilize the at least partial acoustic chamber to generate sound suitable for group listening. While the first audio device and the second audio device are decoupled, the at least partial acoustic chamber may be unformed, and the first audio device and the second audio device may be individually configured to generate sound suitable for personal listening.

In some embodiments, the respective one or more speakers of the first audio device and the second audio device may collectively utilize the at least partial acoustic chamber as a front volume in order to generate sound suitable for group listening. In such embodiments, the frontward side of a speaker of the first audio device may be configured to face the at least partial acoustic chamber and to direct sound into the at least partial acoustic chamber. Similarly, the frontward side of a speaker of the second audio device may also be configured to face the at least partial acoustic chamber and to direct sound into the at least partial acoustic chamber at or about the same time as the first audio device directs sound into the at least partial acoustic chamber. The at least partial acoustic chamber may be configured to have a shape that is suitable for mixing, combining, blending, concentrating, acoustically/passively amplifying, and/or directing the sound output from the first audio device and/or the second audio device. Thus, by coupling together the first and second audio devices, the perceived volume of sound produced from the speakers of the first and second audio device may be increased and/or the characteristics of the sound may be modified, such as by improving the bass response of such sound. According to such embodiments, coupling the first and second audio devices together may enable or improve the ability of the audio system to function as a group-listening device.

In some alternative embodiments, the respective one or more speakers of the first audio device and the second audio device may collectively utilize the at least partial acoustic chamber as a back volume when generating sound suitable for group listening. In such embodiments, a speaker of the first audio device may be configured so that the speaker's rearward-facing side is acoustically coupled to the at least partial acoustic chamber. Similarly, a speaker of the second audio device may be configured so that the speaker's rearward-facing side is acoustically coupled to the at least partial acoustic chamber. By utilizing the acoustic chamber as the back volume, the first and second audio devices may not need to include or utilize space in their respective housings for use as a back volume, thereby enabling those devices to have a smaller overall form factor. Further, because the acoustic chamber forms a relatively large back volume, the first and second audio devices may generate sounds having improved bass responses, for example, by enabling the speakers to leverage the comparatively large back volume provided by the acoustic chamber to generate sounds with lower frequencies.

In some embodiments, one or more speakers included in the first audio device may be configured to operate as personal-listening speakers while the first audio device is not coupled to the second audio device (or, in some embodiments, while also not coupled to a base device). For example, while the first audio device is not coupled to the second audio device, a group-listening speaker included in the first audio device may be deactivated or disabled and a personal-listening speaker included in the first audio device may be activated or enabled. Upon coupling the first audio device to the second audio device (or to the base device), one or more of the speakers included in the first audio device may be configured to operate as group-listening speakers. In a non-limiting example, in response to coupling the first audio device to the second audio device (or to the base device), a group-listening speaker included in the first audio device may be activated or enabled and a personal-listening speaker included in the first audio device may be deactivated or disabled. In some embodiments, coupling or decoupling the first audio device from the second audio device or the base device may cause one or more speakers included in the first audio device to transition from operating in a group-listening mode to a personal-listening mode, or vice versa. Accordingly, in such embodiments, one speaker included in the first audio device may selectively function as either a group-listening speaker or a personal-listening speaker. The second audio device may be configured similarly to the first audio device (e.g., configured as a mirror-image of the first audio device) and thus may include one or more speakers configured to operate as personal-listening speakers while the second audio device is not coupled to the first audio device (or to the base device) and configured to operate as group-listening speakers while coupled to the first audio device (or to the base device).

Various embodiments will be described in detail with reference to the accompanying drawings. Wherever possible, the same reference numbers will be used throughout the drawings to refer to the same or like parts. References made to examples and implementations are for illustrative purposes and are not intended to limit the scope of the invention or the claims.

FIG. 1A is a functional block diagram of an illustrative operating environment 100 that includes an audio system 101 suitable for implementing aspects of the present disclosure, according to some embodiments. In the example illustrated in FIG. 1A, the audio system 101 may include a first audio device 102a and a second audio device 102b. In some optional embodiments, the audio system 101 may also include a base device 103 configured to couple to or otherwise operate in conjunction with one or both of the first audio device 102a and the second audio device 102b.

The first audio device 102a and the second audio device 102b may communicate with each other via a wireless communication link 113, such as a Wi-Fi Direct, Bluetooth®, or similar communication link. In some embodiments, the first audio device 102a and the second audio device 102b may maintain a master-slave relationship in which one of the first audio device 102a or the second audio device 102b (the "master" device) coordinates activities, operations, and/or functions between the devices 102a, 102b via the wireless communication link 113. The other of the first audio device 102a or the second audio device 102b (the "slave" device) may receive commands from and may provide information or confirmations to the master device via the communication link 113. By way of a non-limiting example, the first audio device 102a may be the master device and may provide audio data and timing/synchronization information to the second audio device 102b to enable the second audio device 102b to begin output of the audio data in sync with output of the audio data by the first audio device 102a. In this example, the first audio device 102a may provide a data representation of a song and timing information to the second audio device 102b to enable the second audio device 102a and the first audio device 102a to play the song at the same time via one or more of their respective speakers. Alternatively, the first audio device 102a and the second audio device 102b may be peer devices in which each of the devices 102a, 102b shares information, sensor readings, data, and the like and coordinates activities, operations, functions, or the like between the devices 102a, 102b without one device directly controlling the operations of the other device.

The first audio device 102a and/or the second audio device 102b may be in communication with the base device 103, for example, via wireless communication link 112, 114. In some embodiments, the base device 103 may provide information or other data (e.g., audio data) to each of the first audio device 102a and the second audio device 102b. By way of a non-limiting example, the base device 103 may provide audio data and/or timing data to the first audio device 102a and the second audio device 102b to enable the devices 102a, 102b to play out the audio data at the same or nearly the same time. In some embodiments, the base device 103 may be in communication with only one of the first audio device 102a and the second audio device 102b (e.g., the "master" device, as described), and information or data provided from the base device 103 to the master device may be shared with the other one of the first audio device 102a and the second audio device 102b (e.g., the "slave" device, as described).

In some embodiments, at least one device of the audio system 101 (e.g., one of the first audio device 102a, the second audio device 102b, or the base device 103) may be in communication with one or more computing devices outside of the audio system 101 and may send and receive information and other data to and from these computing devices. In the non-limiting example illustrated in FIG. 1A, at least one device of the audio system 101 may be in communication with a mobile computing device 106 via a wireless communication link 110 and/or another computing device 105 via a wireless communication link 111. For example, the first audio device 102a and the second audio device 102b may each establish a Bluetooth® communication link with the mobile computing device 106 (e.g., a smartphone) and may stream audio from the mobile computing device 106. Those skilled in the art will recognize that the computing devices 105 and 106 may be any of a number of computing devices capable of communicating via a wireless or wired link including, but not limited to, a laptop, personal computer, personal digital assistant (PDA), hybrid PDA/mobile phone, mobile phone, smartphone, wearable computing device (e.g., wireless headphones or earphones), electronic book reader, digital media player, tablet computer, gaming console or controller, kiosk, augmented or virtual reality device, other wireless device, set-top or other television box, or the like.

Additionally (or alternatively), at least one device of the audio system 101 may be in direct or indirect communication with one or more servers 116 via at least one network 121. For example, at least one of the devices in the audio system 101 may establish a wireless communication link 115 (e.g., a Wi-Fi link, a cellular LTE link, or the like) to a wireless access point, a cellular base station, and/or another intermediary device that may be directly or indirectly in communication with the one or more servers 116. In such embodiments, at least one of the devices in the audio system 101 may communicate indirectly with the one or more servers 116 via one or more intermediary devices. In another example, the first audio device 102a and/or the second audio device 102b may send, via the network 121, a request for a stream of audio data from the one or more servers 116, and the one or more servers 116 may respond to the request by providing the first audio device 102a and/or the second audio device 102b with the requested stream of data via a communication link 117 with the network 121. In some embodiments, at least one device of the audio system 101 may include a microphone configured to receive an analog source of sound 104 (e.g., a human).

Each of the communication links 110, 111, 112, 113, 114, 115, 117 described herein may be communication paths through networks (not shown), which may include wired networks, wireless networks or combination thereof (e.g., the network 121). In addition, such networks may be personal area networks, local area networks, wide area networks, cable networks, satellite networks, cellular telephone networks, etc. or combination thereof. In addition, the networks may be a personal area network, local area network, wide area network, over-the-air broadcast network (e.g., for radio or television), cable network, satellite network, cellular telephone network, or combination thereof. In some embodiments, the networks may be private or semi-private networks, such as a corporate or university intranets. The networks may also include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art and, thus, are not described in more detail herein.

For ease of description, the audio system 101 is illustrated in FIG. 1A as being in communication with the devices 105, 106 and the one or more servers 116. However, in some embodiments, the audio system 101 may be in communication with more or fewer communication computing devices and/or servers than those illustrated in FIG. 1A.

Figure 1B:
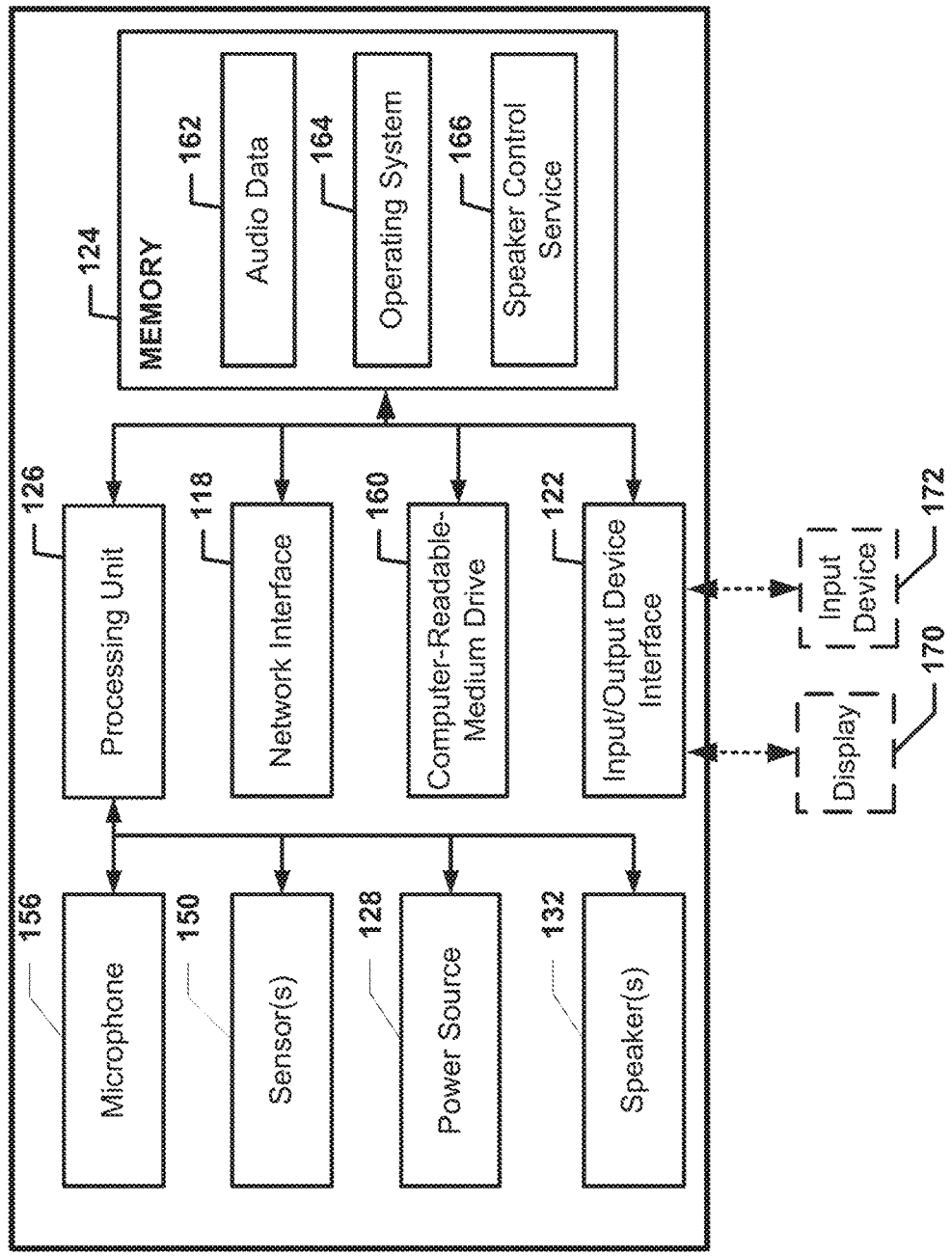
FIG. 1B is a component block diagram illustrating an audio device included in the audio system illustrated in FIG. 1A, according to some embodiments.

FIG. 1B depicts a general architecture of the first audio computing device 102a, which includes an arrangement of computer hardware and software components that may be used to implement aspects of the present disclosure, according to some embodiments. The first audio computing device 102a may include many more (or fewer) elements than those shown in FIG. 1B. It is not necessary, however, that all of these generally conventional elements be shown in order to provide an enabling disclosure.

As illustrated, the first audio device 102a may include (or be coupled to) an input/output device interface 122, a network interface 118, an optional microphone 156, a memory 124, a processing unit 126, a power source 128, an optional display 170, at least one speaker 132, a computer-readable-medium drive 160, all of which may communicate with one another by way of a communication bus. The network interface 118 may provide connectivity to one or more networks or computing systems, and the processing unit 126 may receive and/or send information and instructions from/to other computing systems or services via the network interface 118. For example (as illustrated in FIG. 1A), the network interface 118 may be configured to communicate with the second audio device 102b, the base device 103, the mobile computing device 106, and/or the other computing device 105 via wireless communication links, such as via a Wi-Fi Direct or Bluetooth communication links. The network interface 118 may also (or alternatively) be configured to communicate with one or more computing devices via a wired communication link (not shown). In some embodiments, the network interface 118 may receive audio data from one or more other computing devices and may provide the audio data to the processing unit 126. In such embodiments, the processing unit 126 may cause the audio data to be transformed into an electrical audio signal that is provided to the at least one speaker 132 for output as sound.

The processing unit 126 may communicate to and from memory 124 and may provide output information for an optional display 170 via the input/output device interface 122. In some embodiments, the memory 124 may include RAM, ROM, and/or other persistent, auxiliary or non-transitory computer-readable media. The memory 124 may store an operating system 164 that provides computer program instructions for use by the processing unit 126 in the general administration and operation of the first audio device 102a. In some embodiments, the memory 124 may contain digital representations of audio data 162 or electronic audio signals (e.g., digital copies of songs or videos with audio). In such embodiments, the processing unit 126 may obtain the audio data 162 or electronic audio signals from the memory 124 and may provide electronic audio signals to the at least one speaker 132 for playout as sound.

In some embodiments, the memory 124 may further include computer program instructions and other information for implementing aspects of the present disclosure. For example, in some embodiments, the memory 124 may include a speaker control service 166, which may be executed by the processing unit 126 to perform various operations. In some embodiments, the speaker control service 166 may implement various aspects of the present disclosure, for example, by utilizing sensor information obtained from at least the one or more sensors 150 to determine whether to enable a group-listening mode on the first audio device 102a. In some embodiments, the speaker control service 166 may use such sensor information to determine individually or in collectively with the second audio device 102b and/or another computing device (e.g., the mobile computing device 106 or the base device 103) whether the first audio device 102a and/or the second audio device 102b are secured to the user's ears. In response to determining that at least one of the first audio device 102a or the second audio device 102b is secured to the user's ears, the speaker control service 166 may disable or prevent a user from enabling a group-listening mode in order to protect the user's ears. In response to determining that both the first audio device 102a and the second audio device 102b are both not secured to the user's ears, the speaker control service 166 may cause a group-listening mode to be enabled. The processes by which the speaker control service 166 utilizes to enable group-listening mode selectively are further described with reference to FIG. 9

In some embodiments, the input/output interface 122 may also receive input from an input device 172, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or another input device known in the art. In some embodiments, the microphone 156 may be configured to receive sound from an analog sound source (e.g., the analog sound source 104 described with reference to FIG. 1A). For example, the microphone 156 may be configured to receive human speech. The microphone 156 may further be configured to convert the sound into audio data or electrical audio signals that are directly or indirectly provided to the processing unit 126.

In some embodiments, the one or more sensors 150 may include, but are not limited to, one or more biometric sensors, heat sensors, chronological/timing sensors, geolocation sensors, gyroscopic sensors, accelerometers, pressure sensors, force sensors, light sensors, or the like. In such embodiment, the one or more sensors 150 may be configured to obtain sensor information from a user of the first audio device 102a and/or from an environment in which the first audio device 102a is utilized by the user. The processing unit 126 may receive sensor readings from the one or more sensors 150 and may generate one or more outputs based on these sensor readings. For example, the processing unit 126 may configure a light-emitting diode included on the audio system (not shown) to flash according to a preconfigured patterned based on the sensor readings.

In some embodiments, the second audio device 102b may be a mirror-image of the first audio device 102a and thus may be configured similarly to the first audio device 102a. Accordingly, the second audio device 102b may be configured to include components similar to or the same as one or more of the structural or functional components described above with reference to the first audio device 102a. In some additional (or alternative) embodiments, the base device 103 may also be generally configured to include the same or similar components as the first audio device 102a as described with reference to FIG. 1B.

Figure 2A:
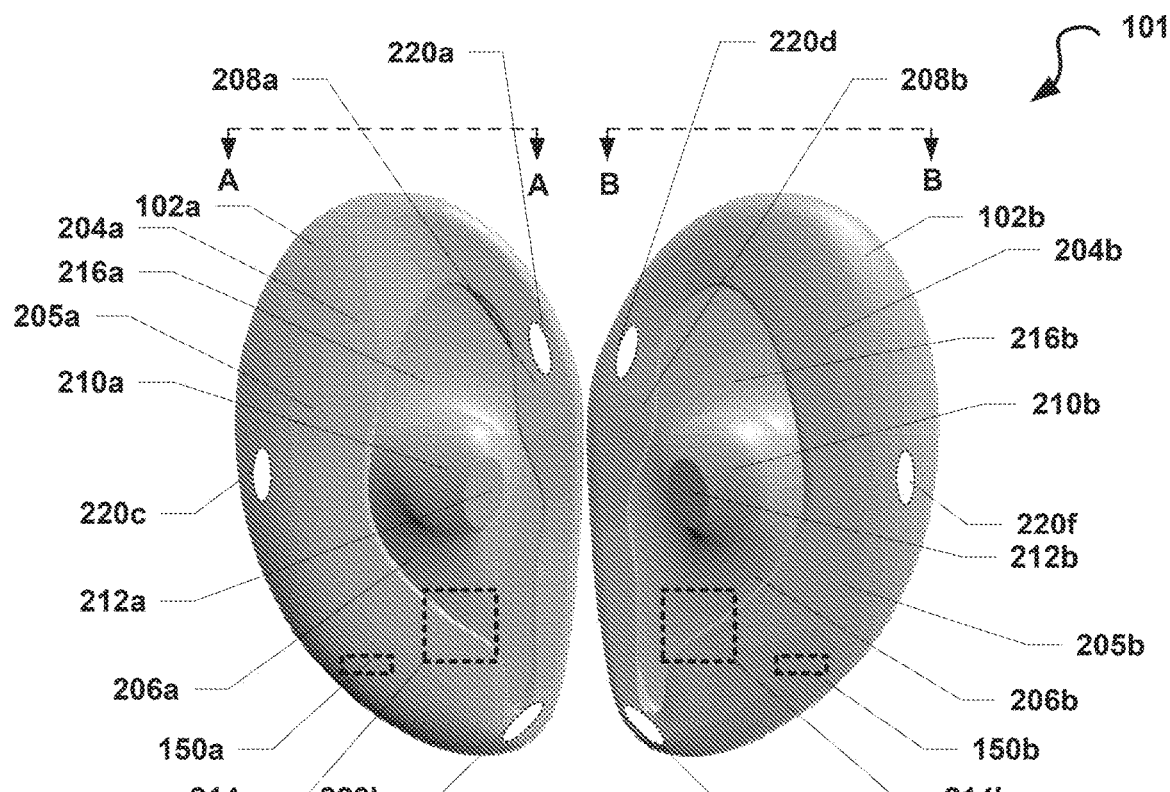
FIG. 2A is an exterior view of a back side of the audio system depicted in FIG. 1A, according to some embodiments.
Figure 2B:
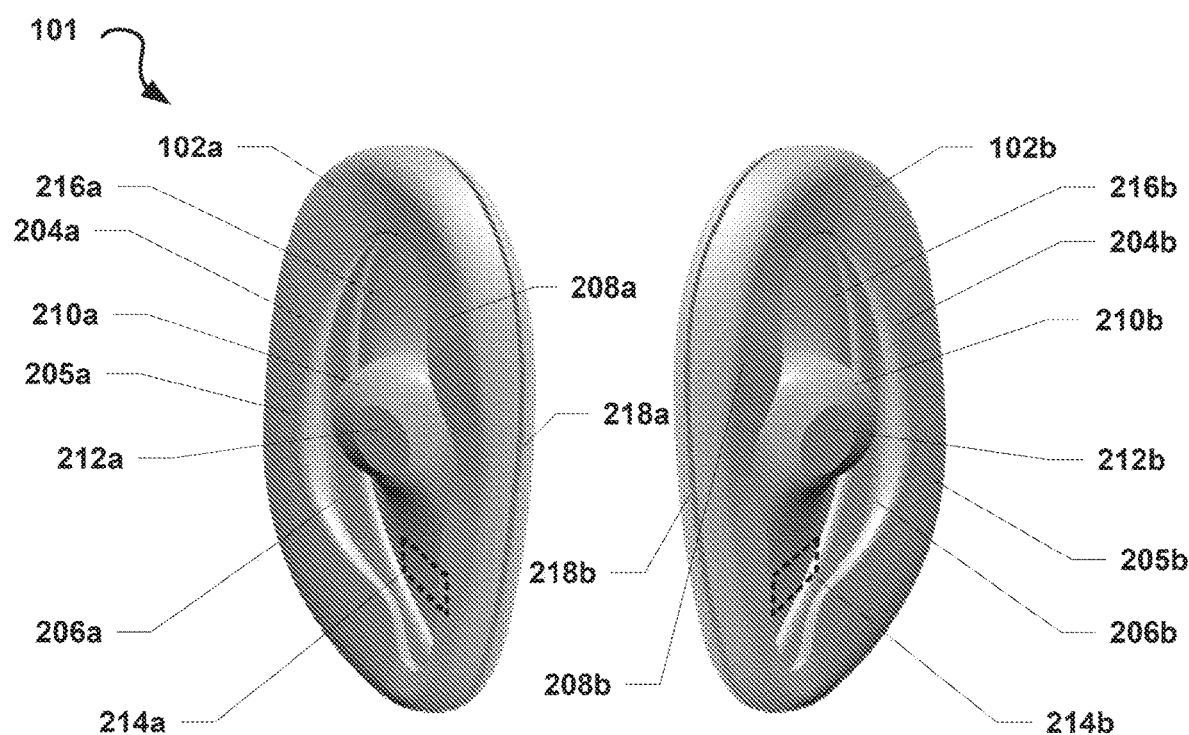
FIG. 2B is an exterior, perspective view of a back side of the audio system depicted in FIG. 2A, according to some embodiments.

FIGS. 2A-2B illustrate different views of the audio system 101 depicted in FIG. 1A, according to some embodiments. FIG. 2A illustrates an exterior view of a back side of the audio system 101. FIG. 2B illustrates a perspective view of the back side of the audio system 101. The audio system 101 may include the first audio device 102a and the second audio device 102b (e.g., as described with reference to FIGS. 1A-1B). For clarity and simplicity of description, duplicative descriptions of the audio system 101, the first audio device 102*a*, and the second audio device 102*b* may not be repeated in the following descriptions.

In some embodiments, the first audio device 102*a* may include a plurality of structural features, including without limitation: a sealing body 204*a* that includes a posterior portion 205*a* and an anterior portion 208*a*, an interior portion 206*a*, an optional mid-ear portion 210*a*, a first speaker 212*a*, an optional second speaker 214*a*, one or more coupling devices 220*a*-220*c*, one or more sensors 150*a* (e.g., similar to the one or more sensors 150 described with reference to FIG. 1B) and a chamber 216*a* formed or defined at least in part by the sealing body 204*a*. Similarly, the second audio device 102*b* may include a plurality of structural features, including without limitation: a sealing body 204*b* that includes a posterior portion 205*b* and an anterior portion 208*b*, an interior portion 206*b*, an optional mid-ear portion 210*b*, a first speaker 212*b*, an optional second speaker 214*b*, one or more sensors 150*b* (e.g., similar to the one or more sensors 150 described with reference to FIG. 1B), one or more coupling devices 220*d*-220*f*, and a chamber 216*b* formed or defined at least in part by the attachment portion 204*b*. Various features of the audio system 101 are further described as follows.

With reference to the examples illustrated in FIGS. 2A and 2B, the sealing body 204*a* of the first audio device 102*a* may be configured to define an opening that is substantially positioned at a center of the sealing body 204*a*. In some embodiments, the sealing body 204*a* may be configured such that the opening defined by the sealing body 204*a* has a shape that approximates a profile of a root of a human ear. The size and shape of the opening may enable a majority of a human ear to pass through the opening. In some embodiments, the chamber 216*a* may be configured to have dimensions suitable for accommodating or housing a majority or all of the outer portion of a human ear that passes through the opening. In some embodiments, while the user's ear is at least substantially encapsulated within the chamber 216*a*, the back surface of the sealing body 204*a* may press against the user's anatomy surrounding the user's ear, thereby forming at least a partial acoustic seal around user's ear. In some embodiments (not shown), a user's ear may be secured to the first audio device 102*a* via an attachment body at least substantially encapsulated within the chamber 216*a* (e.g., an ear hook that hangs on the user's ear).

In some embodiments, the sealing body 204*a* may be at least partially made from a viscoelastic material. A force (e.g., a tensile force) may be applied to the sealing body 204*a* in order to transition the sealing body 204*a* from an initial or resting configuration to a deformed configuration. Specifically, a squeezing or stretching force applied to the top and bottom of the sealing body 204*a* may cause the opening to enlarge or change shape to better accommodate the ear. The sealing body 204*a* may be further configured to revert to the resting configuration when the force applied to the sealing body 204*a* is removed. In some embodiments, the sealing body 204*a* (or a portion thereof) may be configured to revert to the resting configuration from the deformed configuration over a short period of time (e.g., three to five seconds) when the force applied to the sealing body 204*a* is removed. For example, a user may apply a pulling force on the sealing body 204*a* that causes the sealing body 204*a* to transition to a deformed configuration that better accommodates the ear (not shown). The user may remove the pulling force from the sealing body 204*a*, which may cause the sealing body 204*a* to begin gradually returning to the resting configuration. Before the sealing body 204*a* returns to the resting configuration, the user may place the user's ear through the opening of the sealing body 204*a*, which may be elongated or otherwise deformed to accommodate passage of the user's ear through the opening. Once the user's ear is inserted into the chamber 216*a* and secured to the first audio device 102*a* (e.g., via an ear hook within the chamber 216*a*), the sealing body 204*a* may continue transitioning back to the resting configuration, which may also cause the size of at least one dimension of the opening in the sealing body 204*a* to decrease. As such, once the sealing body 204*a* fully returns to the resting configuration, the opening may have reduced in size, thereby securely attaching the first audio device 102*a* to the user. In some embodiments, the sealing body 204*a* may form at least a partial acoustic seal around the user's ear once the sealing body 204*a* returns to the resting configuration around the user's ear.

Additionally (or alternatively), the sealing body 204*a* may be configured to exert a compressive force on the user's ear that forms at least a partial acoustic seal against the user's ear. In such embodiments, the root of the user's ear may prevent the sealing body 204*a* from returning completely to the resting configuration when the first audio device 102*a* is coupled to the ear. As such, the sealing body 204*a* may continuously apply a compressive force to the root of the user's ear while the first audio device 102*a* is coupled to the ear.

In some embodiments (e.g., as illustrated in FIG. 2B), the first audio device 102*a* may include a cover body 218*a*, which may be coupled to the sealing body 204*a*. The cover body 218*a* may be made from one or more materials, including hard or soft plastic, ceramic, metal, rubber, or various other materials or combinations thereof. The cover body 218*a* may be configured to have a shape or perimeter that substantially conforms to a shape or perimeter of the sealing body 204*a* (or vice versa) In such embodiments, the cover body 218*a* may be aligned with and coupled to the sealing body 204 via one or more attachment methods. For example, the cover body 218*a* may be bonded to a surface of the sealing body 204*a* via adhesives or may be fastened to the sealing body 204*a* via one or more interlocking members (not shown) or other fastening devices or techniques.

In embodiments, the optional mid-ear portion 210*a* may be a portion of the sealing body 204*a* that protrudes into the chamber 216*a*. The optional mid-ear portion 210*a* may be configured to be insertable into at least a portion of the user's ear, such as at least a part of the interior portion of the user's ear outside of the ear canal. Accordingly, the optional mid-ear portion 210*a* may be oriented and positioned on or within the chamber 216*a* to ensure that the optional mid-ear portion 210*a* engages the interior portion of the user's ear when the user's ear is secured to the first audio device 102*a*. In some embodiments, the optional mid-ear portion 210*a* may be configured to have a shape that is complementary to the shape of the concha of the ear so that the optional mid-ear portion 210*a* may be wedged in and/or around the concha of the ear. Once inserted into and/or around a part of the interior portion of the ear, the optional mid-ear portion 210*a* may prevent or otherwise limit rotational movement of the first audio device 102*a* around the ear of the user.

Some descriptions of the first audio device 102*a* refer to the sealing body 204*a* as including the anterior portion 208*a*, the posterior portion 205*a*, and the interior portion 206. These descriptions are merely for ease of description and do not require or imply that the anterior portion 208*a*, the posterior portion 205*a*, or the interior portion 206 of the sealing body 204*a* are separate components. Instead, in some embodiments, the sealing body 204*a* may be configured as a single, continuous structure. However, in alternative embodiments, the anterior portion 208*a*, the posterior portion 205*a*, and/or the interior portion 206 of the sealing body 204*a* may be individual components that are joined together to form the sealing body 204*a*, Similarly, the interior portion 206*a* and the optional mid-ear portion 210*a* of the sealing body 204*a* may be part of a single, continuous structure or, in alternative embodiments, may be separate components joined together to form at least a portion of the sealing body 204*a*.

In some embodiments, the first audio device 204*a* may include a first speaker 212*a*, The first speaker 212*a* may be configured as a personal-listening speaker. For example, the first speaker 212*a* may be positioned within the first audio device 204*a* such that the first speaker 212 is oriented towards the ear canal of a user when the first audio device 204*a* is secured to the user's ear. In this example, the first speaker 212*a* may be configured to play out audio that has a volume or energy that is suitable for enabling a user to hear the audio and without damaging the user's hearing.

In some embodiments (e.g., as depicted in the examples illustrated in FIGS. 2A and 2B), the first speaker 212*a* may be coupled to (or embedded within) the optional mid-ear portion 210*a* of the cover body 218*a*, which may enable the first speaker 212*a* to be positioned in proximity to the ear canal of the user's ear when the first audio device 204*a* is secured to the user's ear. However, the first speaker 212*a* is not required to be coupled to or included in the optional mid-ear portion 210. For example, in some embodiments (not shown), the first speaker 212*a* may be included at or coupled to one of various sites on or in the cover body 218*a* or the sealing body 204*a*, and/or the optional mid-ear portion 210*a* may be omitted and the first speaker 212*a* may be coupled to the interior portion 206*a* of the sealing body 204*a*.

In some embodiments, the first speaker 212*a* may be selectively configurable to function as either a personal-listening speaker or as a group-listening speaker. Specifically, the first speaker 212*a* may be configured to switch from a personal-listening mode to a group-listening mode, and vice versa. In such embodiments, while configured as a personal-listening speaker, the first speaker 212*a* may output audio at a level that is appropriate or suitable for playout in proximity to a user's ear. For example, while the first audio device 102*a* is secured to the user's ear, the first speaker 212*a* may be configured to operate as a personal-listening speaker, which may cause the first speaker 212*a* to playout audio that is less than (or equal to) a threshold volume or energy. In some embodiments, the first speaker 212*a* may also be configured to operate in a group-listening mode. In such a mode, the first speaker 212*a* may be able to playout audio at a volume or energy that is higher than the volume or energy that is permitted while the first speaker 212*a* is configured as a personal-listening speaker. For example, while configured as a group-listening speaker, the first speaker 212*a* may be configured to output audio higher than the threshold volume so that a group of people in proximity may be able to hear the audio.

In some embodiments, the first audio device 102*a* may include one or more sensors 150*a*. (e.g., sensor 150 as described with reference to FIG. 1B) that may detect when the first audio device 102*a* is secured to a user's ear. For example, one or more pressure, biometric, light-detecting, or capacitive sensors (or a combination of such sensors) included on or in the first audio device 102*a* may be configured to determine that the first audio device 102*a* is (or is not) secured to a user's ear. In response to determining that the first audio device 102 is secured to a user's ear, the first audio device 102*a* (or, for example, a processing unit included on the first audio device 102*a*) may prevent the first speaker 212*a* from operating as a group-listening speaker in order to avoid potentially damaging the user's hearing. However, under these circumstances, the first audio device 102*a* (or a processing unit on the same) may configure the first speaker 212*a* to operate as a personal-listening speaker. In response to determining that the first audio device 102*a* is not secured to the user's ear, the first audio device 102*a* (or a processing unit on the same) may enable or cause the first speaker 212*a* to operate in the group-listening mode.

In some additional (or additional) embodiments, the one or more sensors 150*a* may be configured to detect when the first audio device 102*a* is coupled to the second audio device 102*b* or to another device (e.g., the base device 103 as described with reference to FIG. 1A). By way of an example, the one or more sensors 150*a* (which may include a Hall-effect sensor) may detect that the first audio device 102*a* is coupled to the second audio device 102*b* by detecting the presence of a magnetic element included in the second audio device 102*b*. In some embodiments, the one or more sensors 150*a* may be configured to determine whether the first audio device 102*a*, is secured to a user's body (e.g., the user's ear), whether the first audio device 102*a* is secured to another device (e.g., the second audio device 102*b* or the base device 103), or whether the first audio device 102*a* is not secured to the user or another device. Configuring the first audio device 102*a* as a personal-listening speaker or as a group-listening speaker based on whether the first audio device 102*a* is coupled to the user, the second audio device 102*b*, or the base device 103 is further described herein e.g., with reference to FIG. 9).

In some alternative (or additional) embodiments, the first audio device 102*a* may be configured to include at least one speaker that is configured as a personal-listening speaker and at least one other speaker that is configured as a group-listening speaker. In the examples illustrated in FIGS. 2A and 2B, the first audio device 102*a* may include the first speaker 212*a*, which may be configured as a personal-listening speaker. Additionally, the first audio device 102*a* may include a second speaker 214*a*, which may be configured as a group-listening speaker. For example, the second speaker 214*a* may be configured to output audio that is louder or that has more energy than audio that is output by the first speaker 212*a*. In some embodiments, the operations and/or configurations of the first speaker 212*a* and/or the second speaker 214*a* may depend on whether the first audio device 102*a* is secured to a user's ear and/or whether the first audio device 102*a* is coupled to the second audio device 102*b* or the base device 103 (e.g., as described above). In response to detecting that the first audio device 102*a* is secured to a user's ear, the first audio device 102*a* (or a processing unit included in the same) may disable the second speaker 214*a* from outputting audio while the first audio device 102*a* is secured to the user's ear. On the other hand, the first audio device 102*a* may cause, allow, or otherwise enable the first speaker 212*a* to output audio while the first audio device 102*a* is secured to the user's ear. Further, in response to determining that the first audio device 102*a* is not secured to a user's ear, the first audio device 102*a* (or a processing unit included in the same) may enable the second speaker 214*a* to output audio. In some embodiments, the first audio device 102*a* may enable or cause only one of the first speaker 212*a* and the second speaker 214*a* to be active at the same time. For example, while the first audio device 102a is not secured to a user's ear, the first audio device 102a may disable the first speaker 212a and may enable only the second speaker 214a.

In some embodiments, the first audio device 102a (or a processing unit included therein) may activate the second speaker 214a after a threshold amount of time has passed since a determination that the first audio device 102a has been removed from a user's ear. For example, a processing unit included in the first audio device 102a (e.g., the processing unit 126) may continually or periodically receive data from one or more of the sensors 150a included in or on the first audio device 102a, and the processing unit may periodically determine whether the first audio device 102a is secured to a user's ear. In response to determining that the first audio device 102a was secured to a user's ear but that the first audio device 102a has not been secured to the user's ear for a threshold period of time, the processing unit may selectively enable the second speaker 214a and/or may enable the first speaker 212a to operate in a group-listening mode.

In the example illustrated in FIGS. 2A and 2B, the first speaker 212a and/or the second speaker 214a may be positioned within a portion of the chamber 216a in proximity to the ear of a user. For example, when the first audio device 102a is secured to the user's ear, the first speaker 212a may be positioned in proximity to the interior portion of the ear (e.g., close to the meatus of the user's ear canal) so that audio played through the first speaker 212a is directed towards the ear canal. In such embodiments, the first speaker 212a may be positioned at a predetermined angle so that sound outputted from the first speaker 212a is directed towards the meatus of the user's ear canal when the first audio device 102a is secured to the user's ear.

In some embodiments, the second audio device 102b may be a mirror-image of the first audio device 102a and thus may be configured in the same or substantially the same way as the first audio device 102a is configured (e.g., as described above). Specifically, the second audio device 102b may include mirrored versions of one or more of the structural and/or functional components included in the first audio device 102a and, as such, may be configured to function and/or to operate the same as or similarly to the first audio device 102a. For ease of description, descriptions of the second audio device 102b or structural/functional components of the second audio device 102b that are similar to descriptions of the first audio device 102a or to structural/functional components of the first audio device 102a are omitted.

In some embodiments, the first audio device 102a may include one or more coupling devices (e.g., the coupling devices 220a-220c of FIG. 2A) that may be configured to engage one or more coupling devices included on or in the second audio device 102b (e.g., the coupling devices 220d-220f of FIG. 2A). For example, in response to positioning the first audio device 102a in proximity to or in physical contact with the second audio device 102b, the coupling devices 220a-220c may engage the coupling devices 220d-220f. Once engaged, the coupling devices 220a-220f may be configured to resist forces that would separate the first audio device 102a and the second audio device 102b away from each other. In some embodiments, the coupling devices 220a-220c and the coupling devices 220d-220f may be complementary fasteners. For example, the coupling devices 220a-220c may be configured to mate physically with the coupling devices 220d-220f via one or more attachment systems, such as male/female interlocking components, hook-and-loop fasteners, non-permanent or reusable adhesives, clips, pins, latches, or the like. In such embodiments, the coupling devices 220a-220f may include a release mechanism, such as a switch, lever, or the like that may unfasten the coupling devices 220a-220f once they are fastened together. Alternatively (or additionally), once coupled together, the coupling devices 220a-220f may be decoupled by pulling the first audio device 102a away from the second audio device 102b with a force that is greater than the force holding the coupling devices 220a-220f together. In some embodiments, the coupling devices 220a-220f may include magnetic elements or have magnetic properties. The coupling devices 220a-220c may be configured to have a magnetic polarity that is opposite of the magnetic polarity of the coupling devices 220d-220f. As such, as the first audio device 204a the second audio device 204b are brought close to each other, the coupling devices 220a-220c and the coupling devices 220d-220f may pull towards each other, thereby urging the first audio device 102a and the second audio device 102b together.

Figure 3:
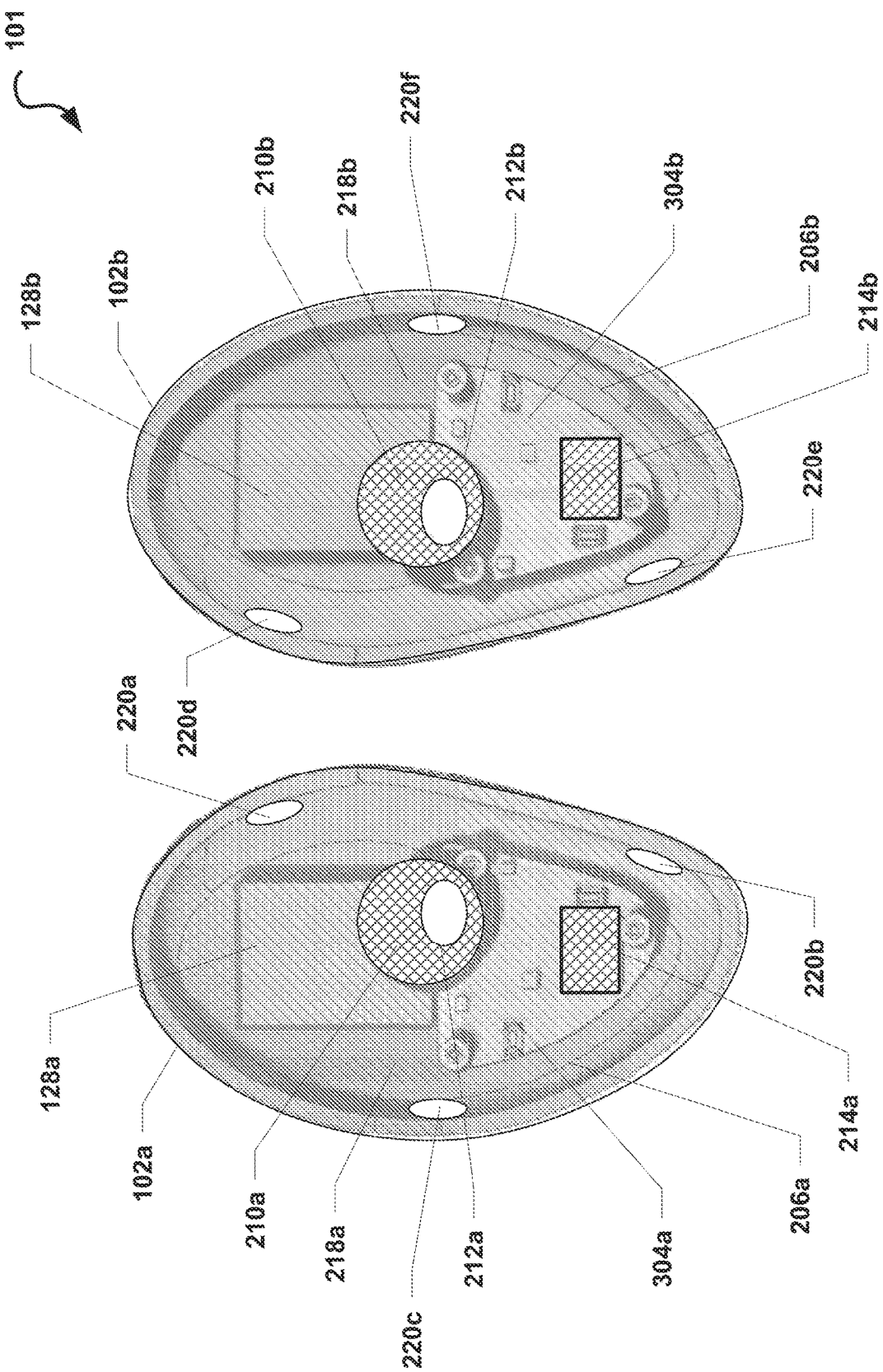
FIG. 3 is a cross-sectional view of the audio system depicted in FIGS. 2A-2B taken along referential lines A and B depicted in FIG. 2A, according to some embodiments.

FIG. 3 illustrates a semi-transparent cross-sectional view of the audio system 101, according to some embodiments. Specifically, FIG. 3 illustrates a cross-sectional view of the first audio device 102a taken along referential line A depicted in FIG. 2A, as well as a cross-sectional view of the second audio device 102b taken along referential line B depicted in FIG. 2A. In some embodiments, the cover body 218a may incorporate or otherwise include at least one power source 128a (e.g., similar to the power source 128 described with reference to FIG. 1B) and one or more processing components 304a. In some examples, the power source 302a may be a battery, such as a lithium-ion battery, and the processing components 304a may include one or more of a flexible circuit or printed circuit board, a processing unit (e.g., a central processing unit and/or a digital signal processing unit), sensors, memory that stores computer-readable instructions that are executed by the processing unit, a transceiver for receiving audio signals from an exterior computing device (e.g., a Bluetooth®, and/or other transceiver), an amplifier, or the like.

In some embodiments (e.g., as further described with reference to FIG. 4B), the cover body 218a may include an input device (e.g., the input device 172 described with reference to FIG. 1B). For example, the cover body 218a may be configured to receive a touch input from a user, and the touch input may be provided to the processing components 304a included in the cover body 218a (e.g., a processing unit or the like). In another example, the cover body 218a may receive a touch input that causes the processing unit to stop, start, or change audio that is played out through one or both of the first speaker 212a and the second speaker 214a.

In some embodiments, the second audio device 102b may be a mirrored version of the first audio device 102a and thus may be configured in the same or substantially the same way as the first audio device 102a is configured. For example, a cover body 218b of the second audio device 102b may include, without limitation, at least one power source 128b and one or more processing components 304b. For ease of description, descriptions of the second audio device 102b or structural/functional components of the second audio device 102b that are similar to descriptions of the first audio device 102a or to structural/functional components of the first audio device 102a are omitted.

Figure 4A:
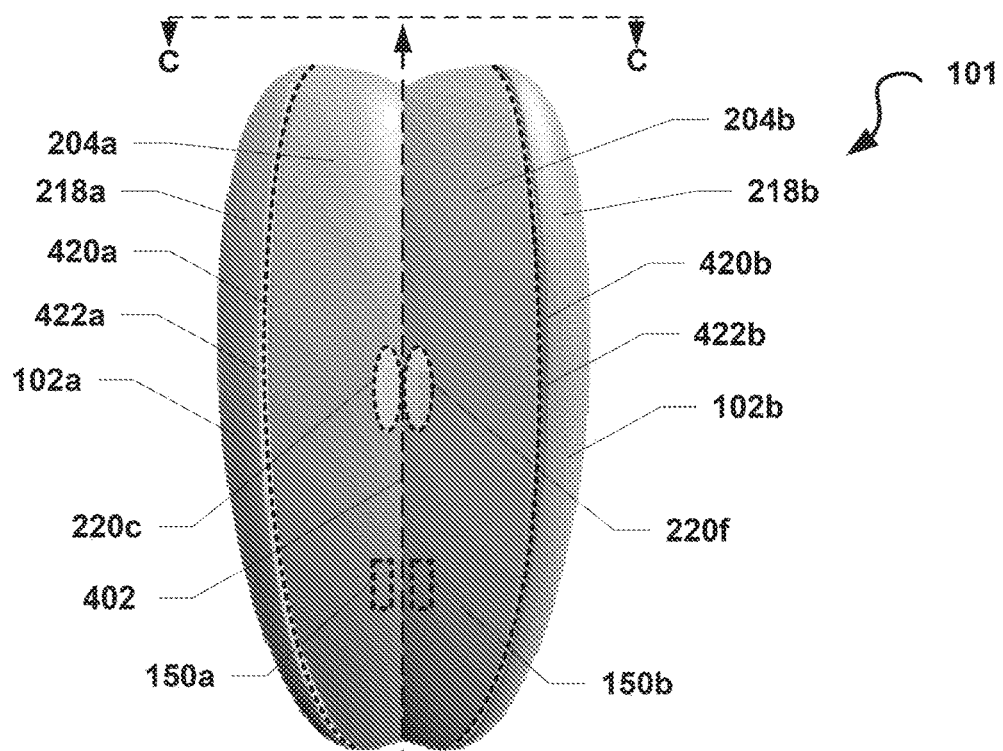
FIG. 4A is an exterior view of a side of the audio system depicted in FIGS. 2A-3, according to some embodiments.
Figure 4B:
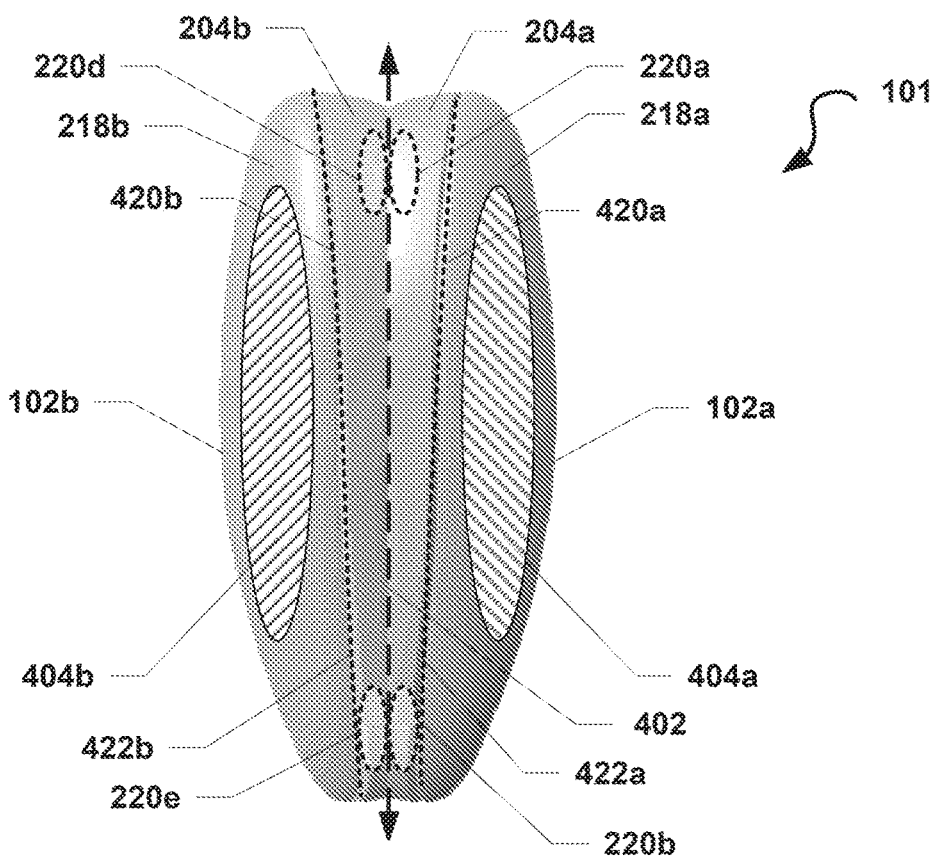
FIG. 4B is an exterior view of another side of the audio system depicted in FIG. 4A, according to some embodiments.
Figure 4C:
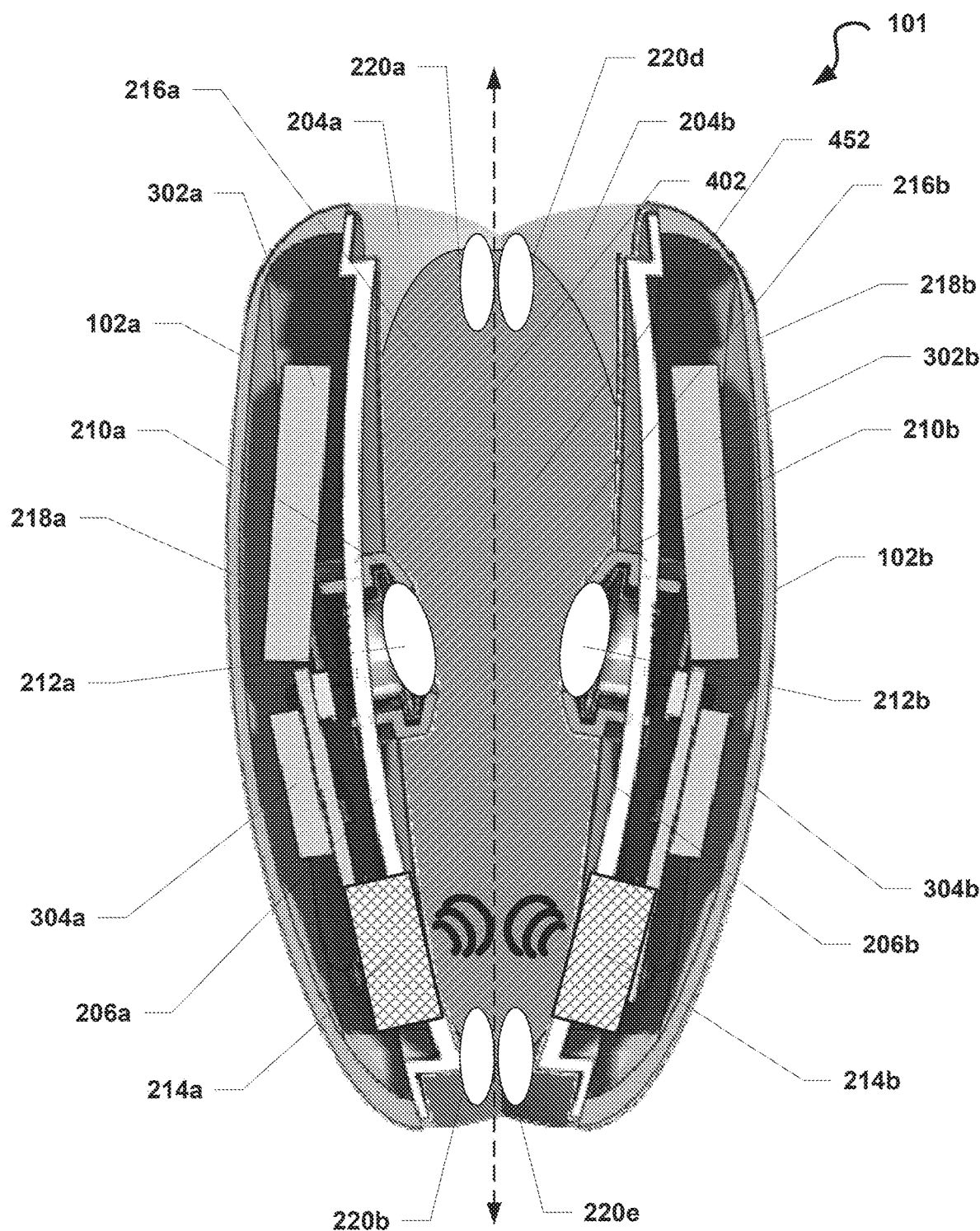
FIG. 4C is a cross-sectional view of a back side of the audio system depicted in FIGS. 4A-4B taken along referential line C depicted in FIG. 4A, according to some embodiments.

FIGS. 4A-4C illustrate different exterior views of the audio system 101 while the first audio device 102a is coupled to the second audio device 102b, according to some embodiments. FIG. 4A illustrates an exterior view of a posterior facing side of the audio system 101, FIG. 4B illustrates an exterior view of an anterior facing side of the audio system 101, and FIG. 4C illustrates a cross-sectional view of the posterior facing side of the audio system 101. In the examples illustrated in FIGS. 4A-4C, the first audio device 102a may be coupled to the second audio device 102b such that the sealing body 204a of the first audio device 102a is aligned in relation to the sealing body 204b of the second audio device 102b and coupled to the sealing body 204b (and vice versa). For example, the sealing body 204a of the first audio device 102a may be coupled to the sealing body 204b of the second audio device 102b along a vertical axis (illustrated by referential line 402).

In some embodiments, the first audio device 102a may be coupled to the second audio device 102b by causing the coupling devices 220a, 220b, 220c of the first audio device 102a to engage the coupling devices 220d, 220e, 220f of the second audio device 102b. In some embodiments in which the coupling devices 220a-220f are or include magnetic elements, the first audio device 102a may be coupled to the second audio device 102b by moving the coupling devices 220a, 220b, 220c close to the coupling devices 220d, 220e, 220f until the coupling devices 220a-220f engage each other magnetically. In some alternative (or additional) embodiments, the coupling devices 220a-220f may be urged together until the coupling devices 220a-220f fasten together via one or more of interlocking parts, adhesive, or the like.

In some embodiments, the first audio device 102a may include a grooved portion 420a between the sealing body 204a and the cover body 218a. The grooved portion 420a may, according to some embodiments, include lighting elements 422a, such as light-emitting diodes (LEDs), that are in communication with at least one processing component of the first audio device 102a (e.g., the processing components 304a as described with reference to FIG. 3). The lighting elements 422a may be configured to illuminate at least a portion of the grooved portion 420a and at least a portion of the exterior of the first audio device 102a. The second audio device 204b may similarly include a grooved portion 420b between the sealing body 204b and the cover body 218b, and the grooved portion 420b may include one or more lighting elements 422b that illuminate at least a portion of the grooved portion 420b and at least a portion of the second audio device 102b.

In some embodiments, the lighting elements 422a in the grooved portion 420a may be configured to selectively activate and deactivate based at least in part on audio that is output from the first speaker 212a and/or the second speaker 214a (not shown). By way of a non-limiting example, the processing components 304a of the first audio device 102a may determine characteristics of audio that is played out of one or both of the speakers 212a, 214a and may cause at least some of the lighting elements 422a to pulse on and off based on those characteristics. For example, the characteristics may include a frequency of beats in a musical arrangement, a volume of the audio (e.g., brighter illumination for louder audio), or the like. The lighting elements 422b of the grooved portion 420b of the second audio device 204b may be similarly configured by the processing components 304b of the second audio device 102b.

In some embodiments, the first audio device 102a and the second audio device 102b may be collectively configured to coordinate activation or deactivation of the lighting elements 422a, 422b, By way of an example, the processing components 304a of the first audio device 102a may be in communication with the processing components 304b of the second audio device 102b (e.g., via one or more transceivers included on the first audio device 102a and the second audio device 102b). The processing components 304a, 304b may communicate with each other in order to coordinate the activation and/or deactivation of the lighting elements 422a, 422b. In some embodiments, this coordination may be based on characteristics of audio that is simultaneously (or nearly simultaneously) being played out on one or more combinations of the first speakers 212a, 212b and/or the second speakers 214a, 214b. For example, the lighting elements 422a, 422b may be activated/deactivated based on a determined tempo of music being played by the first audio device 102a and the second audio device 102b.

In some embodiments, the first audio device 102a may include one or more user input devices 404a (e.g., like the input device 172 described with reference to FIG. 1B). In the example illustrated in FIG. 4B, the input device 404a may be a capacitive touch input area suitable for receiving touch inputs from a user. These touch inputs may be sent from the input device 404a to the one or more processing components 304a of the first audio device 102a, which may convert the touch inputs into commands that are implemented on the first audio device 102a and, in some instance, the second audio device 102b. For example, the input device 404a may receive a touch gesture from a user (e.g., a finger swipe or slide across the capacitive touch input area) that may be translated into a command to increase the volume of the audio that is being played through one or more of the first speaker 212a or the second speaker 214a. In some embodiments, the command may be transmitted from the first audio device 102a to the second audio device 102b and may be at least partially implemented on the second audio device 102b. In the above example, the command to increase the volume of the audio may be implemented both on the first audio device 102a and the second audio device 102b, such as when the first audio device 102a and the second audio device 102b are simultaneously or nearly simultaneously playing the same audio or different portions of the same audio (e.g., different frequencies of the same audio). A user input device 404b of the second audio device 102b may be configured similarly to the user input device 404a of the first audio device 102a.

FIG. 4C illustrates a cross-sectional view of the audio system 101 taken along referential line C depicted in FIG. 4A, according to some embodiments. In the example illustrated in FIG. 4C, the first audio device 102a may be coupled to the second audio device 102b along the referential line 402, such as via the coupling devices 220a-220f (e.g., as described with reference to FIGS. 4A and 4B). In some embodiments, while the first audio device 102a is coupled to the second audio device 102b, the chamber 216a formed within the first audio device 102a and the chamber 216b formed within the second audio device 102b (e.g., as described with reference to FIGS. 2A and 2B) may collectively form an acoustic chamber 452 that may be defined at least in part by the sealing body 204a of the first audio device 102a and the sealing body 204b of the second audio device 102b.

In some embodiments, the acoustic chamber 452 formed by the sealing body 204a and the sealing body 204b may be configured to function as a front volume utilized by one or more of the speaker 212a, 212b, 214a, 214b. By way of a non-limiting example, the first speaker 212a and/or the first speaker 212b may be oriented such that audio that is played out of one or both of the speakers 212a, 212b is directed into the acoustic chamber 452. In such embodiments, the acoustic chamber 452 may be configured to enable audio that is played out from the first speaker 212a and the first speaker 212*b* to mix and/or to combine in the acoustic chamber 452. By way of a non-limiting example, audio may be simultaneously (or substantially simultaneously) played out from each of the first speaker 212*a* and the first speaker 212*b*. The audio played out from the first speaker 212*a* and the first speaker 212*b* may be configured to have a power, volume, or gain having a first value. In this example, the audio from each of the first speakers 212*a*, 212*b* may mix in the acoustic chamber 452 and may be passively amplified as a result, such as through audio signal addition. The resulting sound may have a power, volume, or gain having a second value greater than the first value. In some embodiments, the first speaker 212*a* and the second speaker 212*b* may be configured such that first audio played from the first speaker 212*a* is in phase with second audio played from the first speaker 212*b*. As a result, the first audio may combine with the second audio via constructive interference to produce a resulting audio having a higher amplitude/volume than the first audio or the second audio individually. In some embodiments, audio from the second speakers 214*a* and/or 214*b* may similarly be configured to play out audio into the acoustic chamber 452 in order to amplify or mix such audio.

In some embodiments, the sealing body 204*a* and/or the sealing body 204*b* may be configured so that the acoustic chamber 452 includes one or more openings suitable for enabling sound to exit the acoustic chamber 452 into the external environment via such one or more openings. In such embodiments (e.g., as further described with reference to FIG. 5), sound directed into the acoustic chamber 452 from one or more of the speakers 212*a*, 212*b*, 214*a*, 214*b* may mix within the acoustic chamber 452 and may then exit through one or more of these openings. The openings may be configured or "tuned" so that the sound exiting the acoustic chamber 452 via the one or more openings has a consistent, desirable sound profile. In some alternative embodiments, the first audio device 102*a* and the second audio device 102*b* may be coupled together so that the acoustic chamber 452 is at least substantially air tight.

In some embodiments, the sealing body 204*a* and/or the sealing body 204*b* may be made from soft or pliable materials (or combinations of such materials) that may be resistant to shaking or rattling while the first audio device 102*a* is coupled to the second audio device 102*b* and while at least one of the audio devices 102*a*, 102*b* is playing audio. For example, the sealing body 204*a* and the sealing body 204*b* may be made from a soft silicone material that may be configured to suppress sound waves from transferring from the speakers 212*a*, 212*b*, 214*a*, 214*b* and/or the acoustic chamber 452 through the first audio device 102*a* and/or the second audio device 102*b*.

Figure 4D:
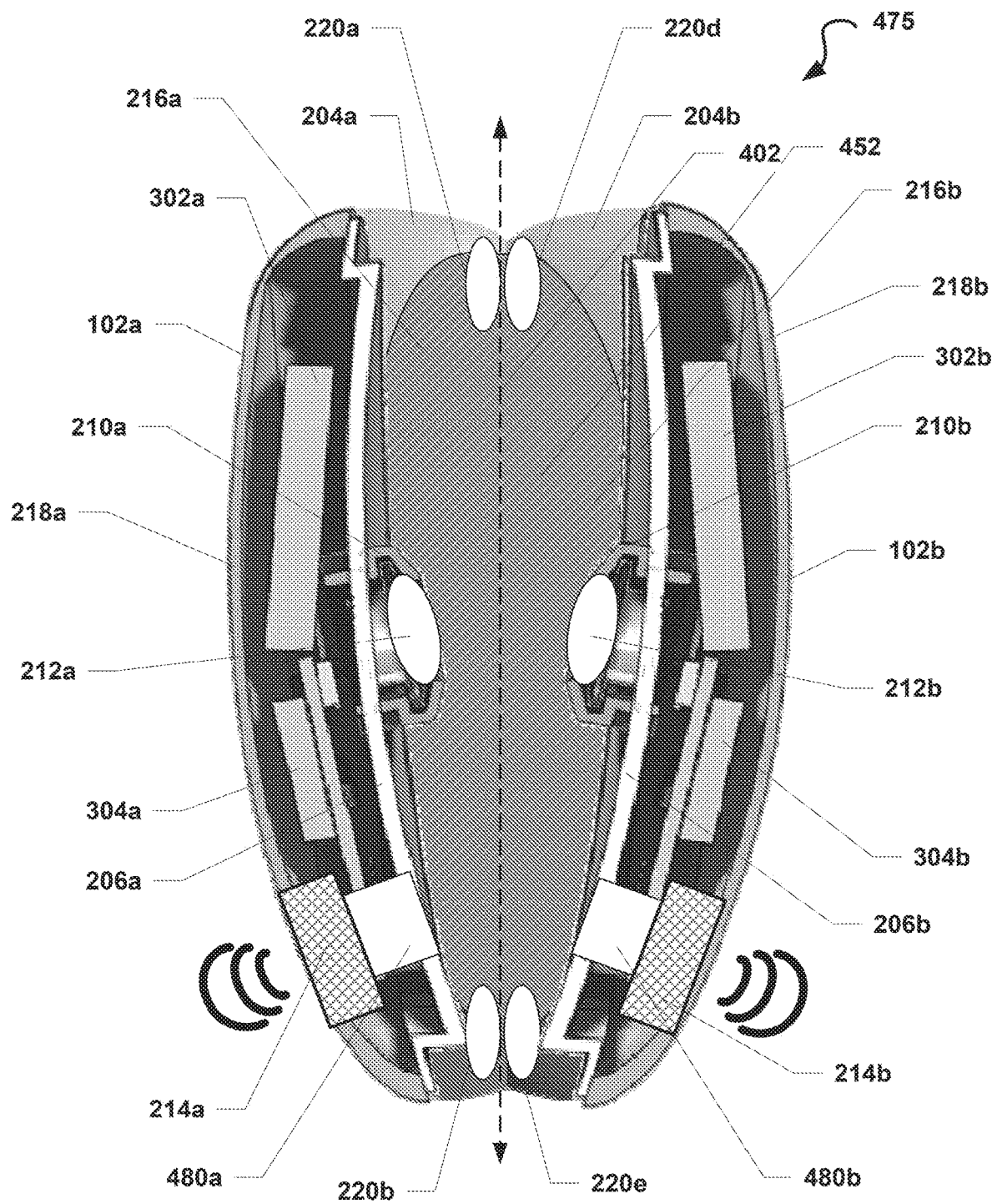
FIG. 4D is a cross-sectional view of a back side of an alternative audio system, according to some embodiments.

FIG. 4D illustrates a cross-sectional view of an alternative audio system 475, according to some embodiments. The audio system 475 may include one or more components and/or structural features that are similar to those described above (e.g., with reference to the audio systems 101 described with reference to FIGS. 1A-4C). Specifically, in some embodiments, the audio system 475 may include, but is not limited to including, the first audio device 102*a* and the second audio device 102*b*. The first audio device 102*a* may include: the sealing body 204*a* having the interior portion 206*a* and configured to form at least part of the chamber 216*a*; the cover body 218*a* housing the power source 302*a* and the processing components 304*a*; the coupling devices 220*a*-220*c*; the first speaker 212*a* (optionally housed in the optional mid-ear portion 210*a*); and the second speaker 214*a*. The second audio device 102*b* may include: the sealing body 204*b* having the interior portion 206*b* and configured to form at least part of the chamber 216*b*; the cover body 218*b* housing the power source 302*b* and the processing components 304*b*; the coupling devices 220*d*-220*f*; the first speaker 212*b* (optionally housed in the optional mid-ear portion 210*b*); and the second speaker 214*b*. For clarity and simplicity of description, duplicative descriptions of structural features of the audio system 475 may not be repeated in the following descriptions.

In the example illustrated in FIG. 4D, the first audio device 102*a* may be coupled to the second audio device 102*b* along the referential line 402, such as via the coupling devices 220*a*-220*f* (e.g., as described with reference to FIGS. 4A and 4B). In some embodiments, while the first audio device 102*a* is coupled to the second audio device 102*b*, the chamber 216*a* formed within the first audio device 102*a* and the chamber 216*b* formed within the second audio device 102*b* may collectively form the acoustic chamber 452 (e.g., as described with reference to FIG. 4C). In some embodiments, the first speaker 212*a* and/or the first speaker 212*b* may be oriented such that audio that is played out of one or both of these speakers may be directed into and combined in the acoustic chamber 452 (e.g., as generally described with reference to FIG. 4C).

In some embodiments, the second speakers 214*a* and/or 214*b* may be configured to utilize the chamber 452 as a back volume. Specifically, the second speakers 214*a* and/or 214*b* may be configured such that their drivers' rearward side is acoustically coupled to the acoustic chamber 452. In such embodiments, the rearward-side of the second speakers 214*a* and/or 214*b* may be coupled to or otherwise in proximity to one or more acoustic ports that enable air in the acoustic chamber 452 to reach the rearward-side of the second speakers 214*a* and/or 214*b*. For example, as illustrated in FIG. 4D, the second speaker 214*a* may be coupled or in proximity to an acoustic port 480*a*, and the second speaker 214*b* may be coupled or in proximity to an acoustic port 480*b*. As generally described herein, the acoustic chamber 452 may form a relatively large volume of air, and the second speakers 214*a*, 214*b* may leverage the comparatively large back volume provided by the acoustic chamber 452 to generate sounds with lower frequencies that are directed away from the acoustic chamber 452 (e.g., as illustrated in FIG. 4D). Additionally (or alternatively), because the second speakers 214*a*, 214*b* may utilize the acoustic chamber 452 as the back volume, the first and second audio devices 102*a*, 102*b* may not need to include or utilize space (or as much space) within their respective cover bodies 218*a*, 218*b* for use as a back volume. As a result, the overall size of the first and second audio device 102*a*, 102*b* may be smaller than alternative designs that utilize space within the cover bodies 218*a*, 218*b* as back volume.

In some embodiments, the first audio device 102*a* and the second audio device 102*b* may be coupled together so that the acoustic chamber 452 is at least substantially air tight. In such embodiments, by ensuring that the acoustic chamber 452 is at least substantially air tight, sound entering the acoustic chamber 452 from the rearward-sides of the second speakers 214*a*, 214*b* that are facing the acoustic chamber 452 may be isolated from sound output from the frontward-sides of the second speakers 214*a*, 214*b*, which may be directed away from the acoustic chamber 452. In some alternative embodiments, the sealing body 204*a* and/or the sealing body 204*b* may be configured so that the acoustic chamber 452 includes one or more openings suitable for enabling sound to exit the acoustic chamber 452 into the external environment via such one or more openings. In such embodiments (e.g., as further described with reference to FIG. 5), sound directed into the acoustic chamber 452 from the speakers 214a, 214b may exit through one or more of these openings. The openings may be configured or "tuned" so that the sound exiting the acoustic chamber 452 via the one or more openings has a consistent, desirable sound profile or so that the sound exiting the acoustic chamber 452 does not substantially interfere with sound output from the frontward-facing side of the second speakers 214a, 214b.

Figure 5:
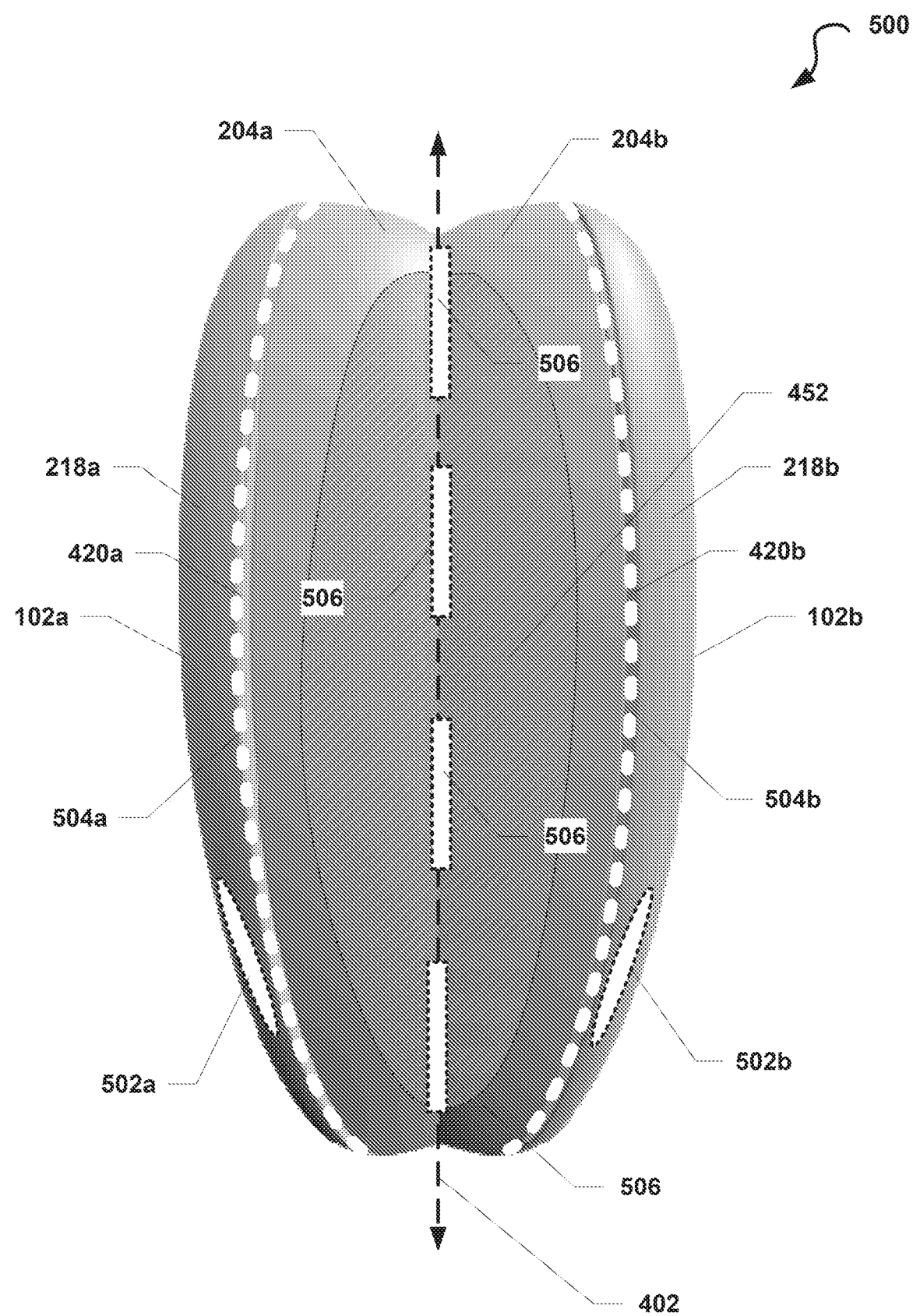
FIG. 5 is an exterior view of a back side of an alternative audio system, according to some embodiments.

FIG. 5 illustrates an audio system 500, according to some embodiments. The audio system 500 may include, but is not limited to including, the first audio device 102a and the second audio device 102b. The first audio device 102a may include the sealing body 204a and the cover body 218a. The second audio device 102b may include the sealing body 204b and the cover body 218b. Some of the structural features of the audio system 500 may be analogous to structural features described above (e.g., with reference to the audio systems 101, 475 described with reference to FIGS. 1A-4D). For clarity and simplicity of description, duplicative descriptions of such structural features of the audio system 500 may not be repeated in the following descriptions.

In the example illustrated in FIG. 5, the first audio device 102a and the second audio device 102b may be coupled together to form the acoustic chamber 452 within the sealing bodies 204a, 204b (e.g., as described with reference to FIGS. 4A-4D). In some embodiments, the sealing body 204a and the sealing body 204b may be configured to include one or more air gaps 506 (e.g., along a vertical axis represented by the referential line 402) between the first audio device 102a and the second audio device 102b such that audio originating from within the acoustic chamber 452 (e.g., by one or more of the speakers 212a, 212b, 214a, 214b) may be projected through the one or more air gaps 506. In some embodiments, the sealing body 204a and/or the sealing body 204b may be configured such that at least one or more portions of the sealing body 204a and the sealing body 204b do not physically engage while the first audio device 102a is coupled to the second audio device 102b, thereby forming the one or more air gaps 506. By way of a non-limiting example, a portion of the sealing body 204a may be configured to have alternating protruding and recessing portions (e.g., a tooth-and-gap or zipper-like configuration) so that the protruding portions physically engage the sealing body 204b while the recessive portions do not physically engage the sealing body 204b. Additionally (or alternatively), the sealing body 204b may be similarly configured such that, while the first audio device 102a is coupled to the second audio device 102b, at least one protruding portion of the sealing body 204b physically engages the sealing body 204a while at least one portion of the sealing body 204b does not physically engage the sealing body. In yet another embodiment, the first audio device 102a and/or the second audio device 102b may include one or more actuators (e.g., piezoelectric actuators, not shown) that may be configured to cause the first audio device 102a and the second audio device 102b to separate at least slightly such as along a vertical axis represented by the referential line 402 in order to allow sound from the acoustic chamber 452 to be projected away from the audio system 500.

In some embodiments, the first audio device 102a and the second audio device 102b may each be configured to include one or more acoustic ports 504a, 504b, respectively, that may be configured to allow audio originating from the acoustic chamber 452 to be projected and/or directed from the acoustic chamber 452 away from the audio system 500. By way of an example, the grooved portion 420a of the first attachment device 102a may be configured to include the acoustic ports 504a, which may be perforations in the grooved portion 420a that are hermetically and/or acoustically connected to the acoustic chamber 452. The grooved portion 420b may be configured similarly and thus may include the acoustic ports 504b.

In some embodiments, the cover body 218a may include an acoustic port 502a which may be configured to enable sound (e.g., form the second speaker 214a) to be directed away from the first audio device 102a. The second audio device 102b may also (or alternatively) include an acoustic port 502b in cover body 218b, which may be configured to function similarly to the acoustic ports 502a, 502b. In some embodiments, the acoustic ports 502a, 502b may have at least one dimension that is larger than a dimension of the acoustic ports 504a, 504b.

Figure 6:
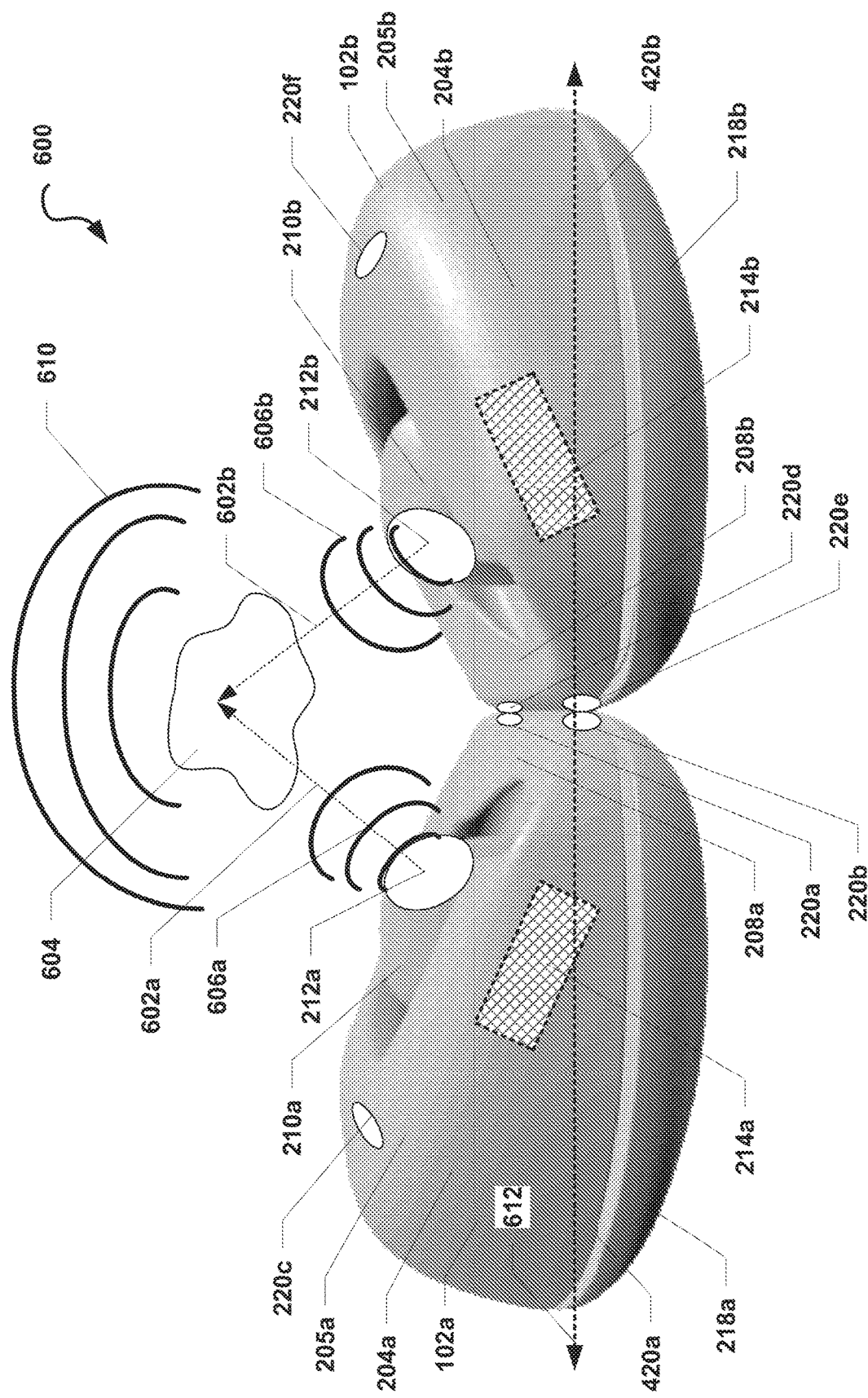
FIG. 6 is a perspective view of a bottom side of an alternative audio system having an alternative configuration, according to some embodiments.

FIG. 6 illustrates an audio system 600, according to some embodiments. The audio system 600 may include, but is not limited to including, the first audio device 102a and the second audio device 102b. The first audio device 102a may include the sealing body 204a, the cover body 218a, the first speaker 212a, the optional mid-ear portion 210a, the anterior portion 208a of the sealing body 204a, the posterior portion 205a of the sealing body 204a, and the coupling devices 220a-220c. The first audio device 102a may optionally include the second speaker 214a and the grooved portion 420a. The second audio device 102b may include the sealing body 204b, the cover body 218b, the first speaker 212b, the optional mid-ear portion 210b, the anterior portion 208b of the sealing body 204b, the posterior portion 205b of the sealing body 204b, and the coupling devices 220d-220f. The second audio device 102b may optionally include the second speaker 214b and the grooved portion 420b. Some of the structural features of the audio system 600 may be analogous to structural features described above (e.g., with reference to the audio systems 101, 475, 500 described with reference to FIGS. 1A-5). For clarity and simplicity of description, duplicative descriptions of such structural features of the audio system 600 may not be repeated in the following descriptions.

In some embodiments, the first audio device 102a may be coupled to the second audio device 102b. In the example illustrated in FIG. 6, the anterior portion 208a of the sealing body 204a may be coupled to the anterior portion 208b of the sealing body 204b when the coupling devices 220a, 220b in the anterior portion 208a of the sealing body 204a physically engage the coupling devices 220e, 220d included in the anterior portion 208b of the sealing body 204b. By way of a non-limiting example, the coupling devices 220a, 220b, 220d, 220e may include magnetic portions and may engage physically via magnetic attraction. In some embodiments, the first audio device 102a and the second audio device 102b may be coupled together such that an angle of attachment (e.g., as illustrated by referential angle 612) formed by the first audio device 102a and the second audio device 102b is or is close to 180 degrees.

As described, the first speaker 212a and the first speaker 212b may be configured to play out audio. In some embodiments, the first speaker 212a and the first speaker 212b may be respectively oriented within the first audio device 102a and the second audio device 102b such that audio 606a that is played out from the first speaker 212a is projected in a direction 602a and audio 606b that is played out from the first speaker 212b is directed along another direction 602b. In such embodiments, the directions 602a, 602b may intersect at an acoustic convergence zone 604, which may be an area near the first and second audio device 102a, 102b in which the audio 606a, 606b mixes, blends, or otherwise combines into a combined audio 610. For example, the audio 606a, 606b may be in phase with each other and may combine in the convergence zone to form the combined audio 610 via a process of constructive interference. Accordingly, the combined audio 610 may have a volume, gain, and/or energy that is greater than the same for either of the audio 606a or 606b individually. By way of another example, the audio 606a and 606b may be separate audio portions of the same audio output (e.g., separate monophonic sounds). In this example, the audio 606a and 606b may blend within the acoustic convergence zone 604 such that the combined audio 610 formed from the audio 606a and 606b includes the complete audio output (e.g., stereophonic sound).

Figure 7:
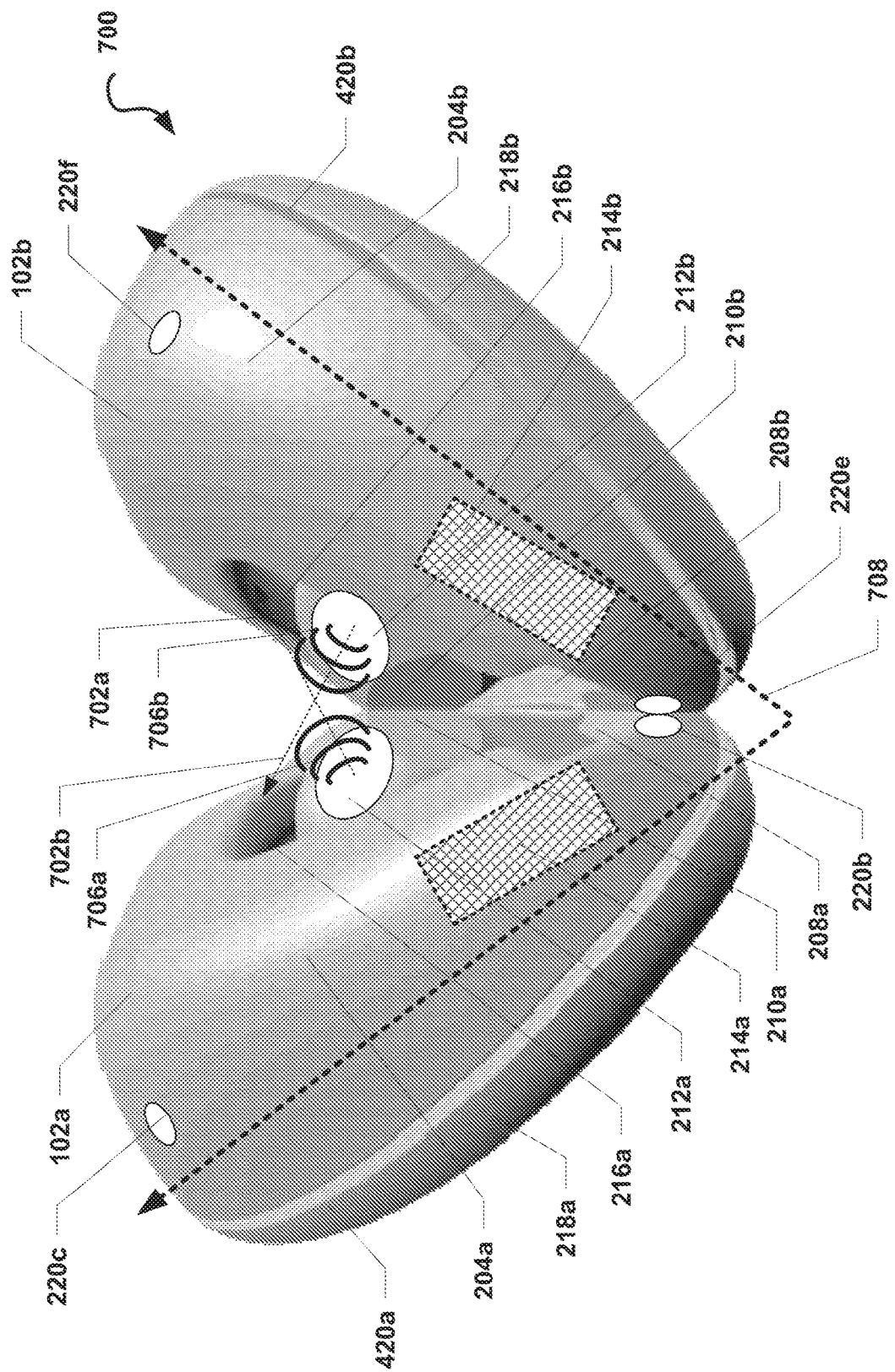
FIG. 7 is a perspective view of a bottom side of an alternative audio system having an alternative configuration, according to some embodiments.

FIG. 7 illustrates an audio system 700, according to some embodiments. The audio system 700 may include, but is not limited to including, the first audio device 102a and the second audio device 102b. The first audio device 102a may include the sealing body 204a, the cover body 218a, the first speaker 212a, the optional mid-ear portion 210a, the anterior portion 208a of the sealing body 204a, the chamber 216a formed within the sealing body 204a, the posterior portion 205a of the sealing body 204a, and the coupling devices 220a-220c. The first audio device 102a may optionally include the second speaker 214a and the grooved portion 420a. The second audio device 102b may include the sealing body 204b, the cover body 218b, the first speaker 212b, the optional mid-ear portion 210b, the anterior portion 208b of the sealing body 204b, the chamber 216b formed within the sealing body 204b, the posterior portion 205b of the sealing body 204b, and the coupling devices 220d-220f. The second audio device 102b may optionally include the second speaker 214b and the grooved portion 420b. Some of the structural features of the audio system 700 may be analogous to structural features described above (e.g., with reference to the audio systems 101, 475, 500, 600 described with reference to FIGS. 1A-6). For clarity and simplicity of description, duplicative descriptions of such structural features of the audio system 700 may not be repeated in the following descriptions.

In the example illustrated in FIG. 7, the anterior portion 208a of the sealing body 204a may be coupled to the anterior portion 208b of the sealing body 204b, for example, via the coupling devices 220a, 220b, 220d, 220e (partially hidden in the example illustrated in FIG. 7). By way of a non-limiting example, the coupling devices 220a, 220b, 220d, 220e may include magnetic portions and may engage physically via magnetic attraction. In some embodiments, the first audio device 102a and the second audio device 102b may be coupled together such that an angle of attachment (e.g., as illustrated in FIG. 7 by referential angle 708) formed by the first audio device 102a and the second audio device 102b is an acute angle (e.g., an angle less than 180 degrees and greater than 0 degrees, such as a 45-degree angle). In some embodiments, because the first audio device 102a and the first audio device 102b are coupled together at an acute angle, the first speaker 212a (and/or the second speaker 214a) may output audio 706a in a direction 702a that causes at least a portion of the audio 706a to enter the chamber 216b of the second audio device 102b. Similarly, the first speaker 212b and/or the second speaker 214b may output audio 706b in a direction 702b that causes at least a portion of the audio 706b to enter into the chamber 216a of the first audio device 102a. As such, the chamber 216a and the chamber 216b may collectively function as an acoustic chamber (e.g., similar to the acoustic chamber 452 as described with reference to FIG. 4). In such embodiments, the chambers 216a, 216b may be configured collectively to enable audio that is played out from the first speaker 212a and the first speaker 212b (and/or the second speakers 214a, 214b) to mix, amplify, and/or to combine. By way of a non-limiting example, the audio 706a, 706b may be simultaneously (or substantially simultaneously) played out from each of the first speaker 212a and the first speaker 212b. The audio 706a, 706b played out from the first speaker 212a and the first speaker 212b, respectively, may be configured to have a power, volume, or gain having a first value. The audio 706a, 706b from each of the first speakers 212a, 212b may mix in the chambers 216a, 216b and, as a result of that mixture, may be amplified, such as through constructive interference. In some embodiments, audio from the second speakers 214a and/or 214b may similarly be configured to play out audio that is directed in to the chambers 216a, 216b as described. In some embodiments, the first audio device 102a and the second audio device 102b may be coupled together so that the audio 706a, 706b is configured to project from the audio system 700 in substantially the same direction.

Figure 8A:
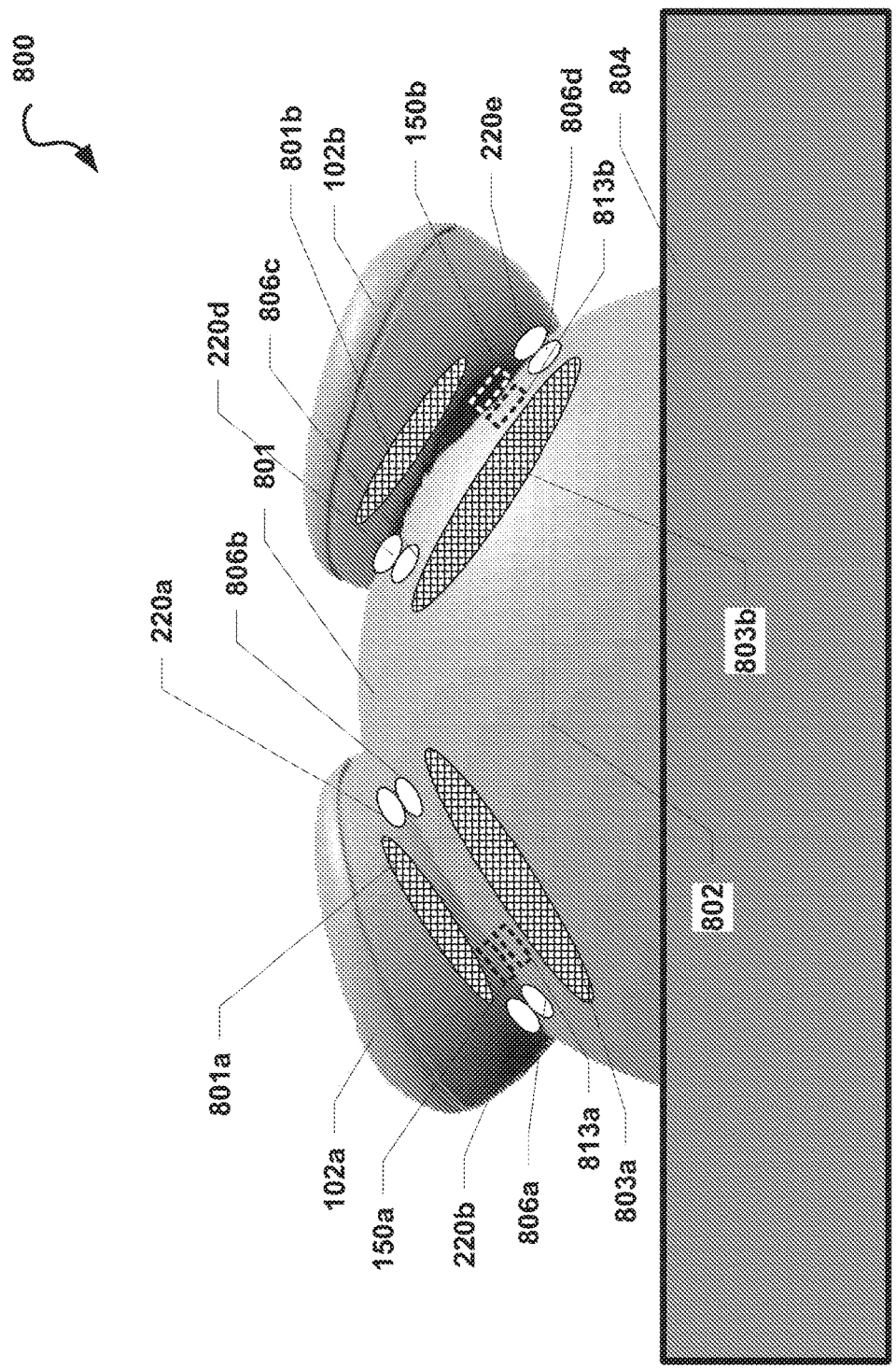
FIG. 8A is an external view of a side of an audio system that includes a base device, according to some embodiments.

FIG. 8A illustrates an audio system 800, according to some embodiments. The audio system 800 may include, but is not limited to including, the first audio device 102a and the second audio device 102b. Some of the structural features of the audio system 800 may be analogous to structural features described above (e.g., with reference to the audio systems 101, 475, 500, 600, 700 described with reference to FIGS. 1A-7). For clarity and simplicity of description, duplicative descriptions of such structural features of the audio system 800 may not be repeated in the following descriptions.

In some embodiments, the audio system 800 may include a base device 801. The base device 801 may include a coupling portion 802 and a base portion 804. In such embodiments, the coupling portion 802 may include one or more coupling devices, such as coupling devices 806a, 806b, 806c, 806d. The coupling devices 806a, 806b, 806c, 806d may be one or more of magnetic elements, fasteners, mating components, or the like. In some embodiments, each of the first audio device 102a and the second audio device 102b may be configured to couple to the coupling portion 802 of the base device 801. In the example illustrated in FIG. 8A, the first audio device 102a may couple to the coupling portion 802 by moving or urging the coupling devices 220a, 220b of the first audio device 102a towards the coupling devices 806a, 806b of the coupling portion 802 until the coupling devices 220a, 220b, 806a, 806b engage each other. Similarly, the second audio device 102b may couple to the coupling portion 802 by moving or urging the coupling devices 220d, 220e of the second audio device 102b towards the coupling devices 806c, 806d of the coupling portion 802 until the coupling devices 220d, 220e, 806d, 806d engage each other.

The coupling portion 802 may include charging component 803a, 803b. In some embodiments, the charging components 803a, 803b may be inductive charging components configured to generate an electromagnetic field from electrical power received on the base device 801 (e.g., from an electrical cord coupled to the base device 801 and connected to a wall outlet (not shown)) that may be received by complementary charging components 801a, 801b included on the first audio device 102a and the second audio device 102b, respectively. As such, while the first audio device 102a is coupled to the coupling portion 802, the charging component 803a of the coupling portion 802 may generate an electromagnetic field that may be received and converted into electrical power by a complementary inductive charging component 801a of the first audio device 102a. In some embodiments, the first audio device 102a may be configured to utilize this electrical power to power one or more components of the first audio device 102a and/or to store the electrical power in a power storage device (e.g., a battery). Similarly, while the second audio device 102b is coupled to the coupling portion 802, the charging component 803b of the coupling portion 802 may generate an electromagnetic field that may be received and converted into electrical power by a complementary inductive charging component 801b of the second audio device 102b. In some embodiments, the second audio device 102b may be configured to utilize this electrical power to power one or more components of the second audio device 102b and/or to store the electrical power in a power storage device (e.g., a battery).

In some embodiments, the base device 801 may include one or more sensors 813a, 813b. The sensors 813a, 813b may be configured to determine whether the first audio device 102a, the second audio device 102b, and/or both audio devices 102a, 102b are coupled to the coupling portion 802. For example, the sensors 813a, 813b may be or include one or more capacitive sensors, magnetic sensors, or the like. In such embodiments, the one or more sensors 150a, 150b included on the first audio device 102a and the second audio device 102b, respectively, may be configured to determine whether the audio devices 102a are coupled to the base device 801. In some embodiments, the sensors 150a, 150b, 813a, 813b may be coupled to a processing unit that may be configured to determine the identity of a device coupled to the sensors 150a, 150b, 813a, 813b. For example, the processing unit of the first audio device 102a may determine (e.g., based on information provided by the one or more sensors 150a) that the first audio device 102a is coupled to the base device 801 and not the second audio device 102b (or vice versa).

Figure 8B:
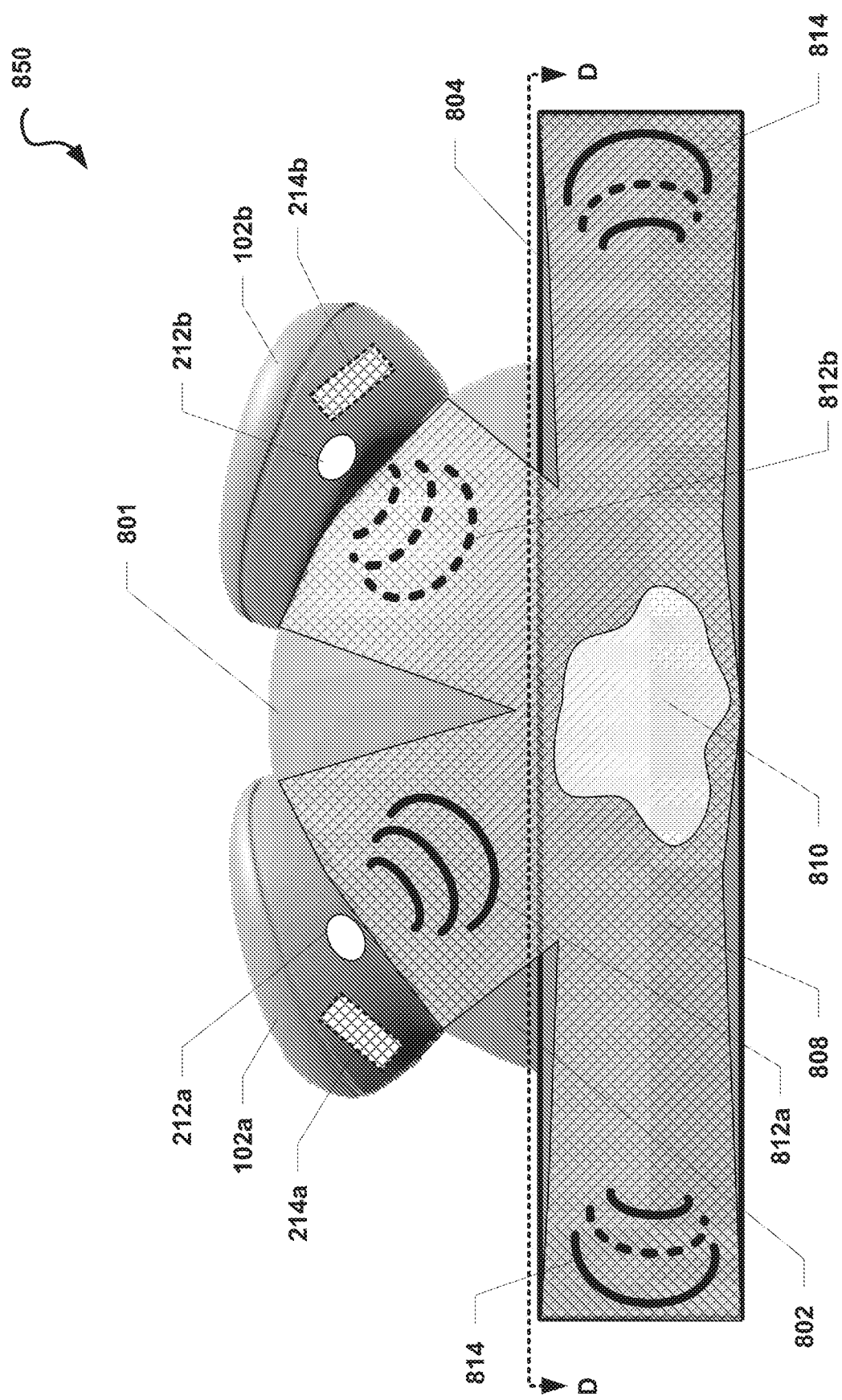
FIG. 8B is a semi-transparent, exterior view of a front side of another audio system that includes a base device having an alternative design, according to some embodiments.
Figure 8C:
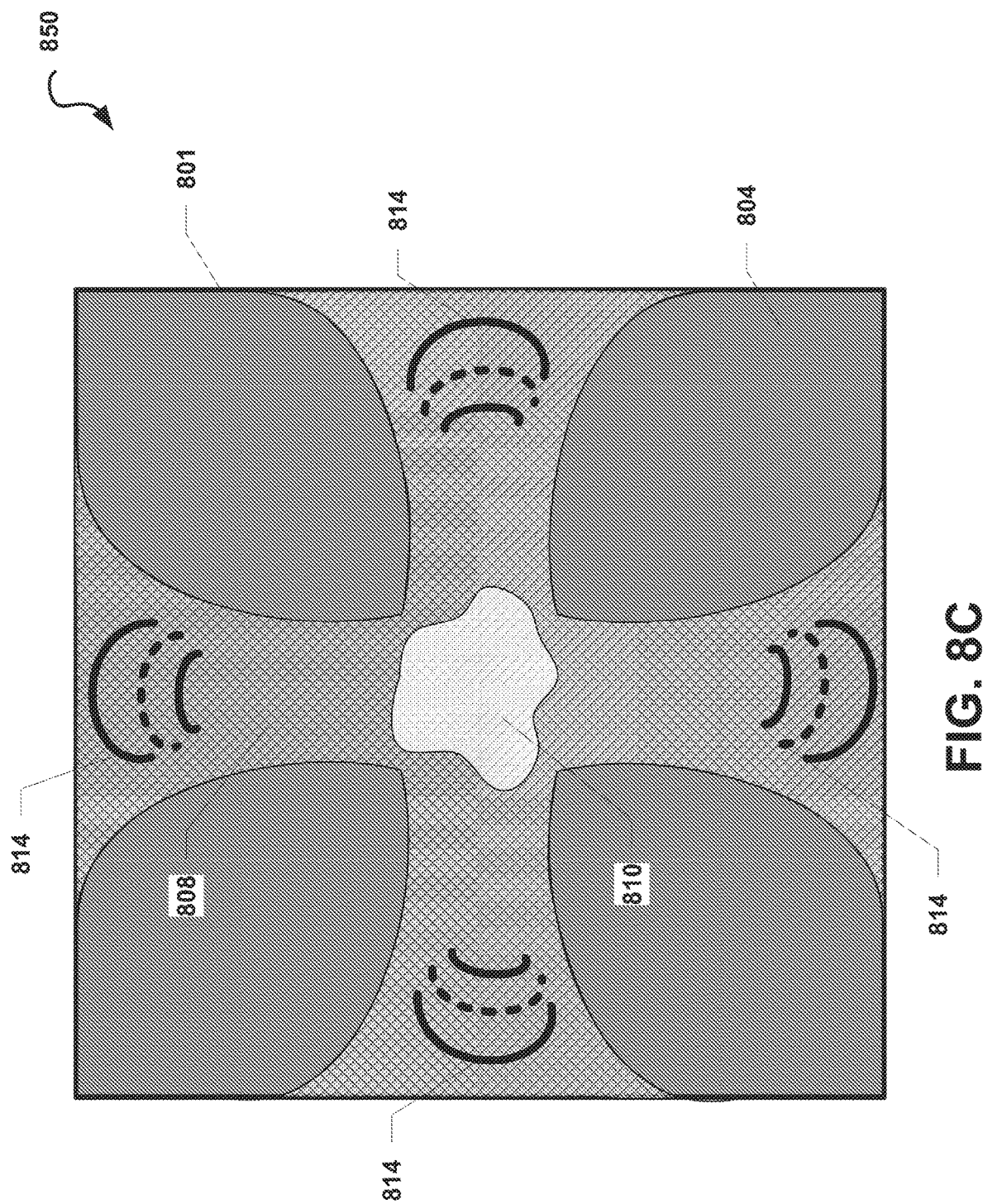
FIG. 8C is a cross-sectional view of a top side of the audio system depicted in FIG. 8B, according to some embodiments.

FIGS. 8B and 8C illustrate different exterior views of an audio system 850, according to some embodiments. FIG. 8B illustrates a side view of the audio system 850. FIG. 8C illustrates a top-down view of the audio system 850. In some embodiments, the audio system 850 may include, but is not limited to including, the first audio device 102a, the second audio device 102b, and the base device 801. The first audio device 102a may include the first speaker 212a and, optionally, the second speaker 214a. The second audio device may include the first speaker 212b and, optionally, the second speaker 214b. The base device 801 may include the coupling portion 802 and the base portion 804. Some of the structural features of the audio system 850 may be analogous to structural features described above (e.g., with reference to the audio systems 101, 475, 500, 600, 700, 800 described with reference to FIGS. 1A-8A). For clarity and simplicity of description, duplicative descriptions of such structural features of the audio system 850 may not be repeated in the following descriptions.

With reference to FIG. 8B, the base device 801 may be configured to include a substantially hollow portion 808 within the interior of the base device 801. In the example illustrated in FIG. 8B, the coupling portion 802 may include an opening to the hollow portion 808 at positions at which each of the first audio device 102a and the second audio device 102b couple to the coupling portion 802. In such embodiments, the first speaker 212a (and, optionally, the second speaker 214a) may be oriented such that audio 812a that is played out of the first speaker 212a (and/or the second speaker 214b) passes into the hollow portion 808. Similarly, the second audio device 102a may be coupled to the coupling portion 802 in proximity to another opening to the hollow portion 808 of the base device 801. In such embodiments, the first speaker 212b (and, optionally, the second speaker 214b) may be oriented such that audio 812b that is played out of the first speaker 212b (and/or the second speaker 214b) passes into the hollow portion 808.

In some embodiments, the hollow portion 808 may be configured to funnel, channel, or otherwise direct the audio 812a, 812b through the hollow portion 808 towards an acoustic convergence zone 810. In some embodiments, the acoustic convergence zone 810 may be an area in which the audio 812a, 812b mixes, blends, or otherwise combines into combined audio 814. For example, the audio 812a, 812b may be in phase with each other and may combine in the convergence zone to form the combined audio 814 via a process of constructive interference. Accordingly, the combined audio 814 may have a volume, gain, and/or energy that is greater than either of the audio 812a or 812b individually. By way of another example, the audio 812a and 812b may be separate audio portions of the same audio output (e.g., separate monophonic sounds). In this example, the audio 812a and 812b may blend within the acoustic convergence zone 810 such that the combined audio 814 formed from the audio 812a and 812b includes the complete audio output (e.g., stereophonic sound).

In some embodiments, the hollow portion 808 may be configured to funnel, channel, or otherwise direct the combined audio 814 from the acoustic convergence zone 810 through the hollow portion 808 to openings to the exterior of the base device 801. In the example illustrated in FIG. 8B, the hollow portion 808 may be configured to direct the combined audio 814 to openings at each side of the hollow portion 808. Because the combined audio 814 may be amplified, mixed, directed, or blended within the hollow portion 808 (e.g., within the acoustic convergence zone 810), the combined audio 814 may have characteristics that are at least partially distinct from characteristics of the audio 812a or the audio 812b. In this example, the audio 814 that is projected from the hollow portion 808 of the base device 801 may be noticeably louder than audio played from the first audio device 102a and the second audio device 102b separately.

With reference to FIG. 8C, the hollow portion 808 of the base portion 804 of the base device 801 may be configured such that the combined audio 814 is directed away from the base device 801 in multiple directions. In the example illustrated in FIG. 8C, the hollow portion 808 may include four opening to the external environment, and these opening may be arranged so that the combined audio 814 is directed (at least substantially) in a 360-degree arc away from the base device 801. In such embodiments, two users may be able to hear at least substantially the same representation of the combined audio 814 without having to stand in the same place relative to the base device 801.

Figure 9:
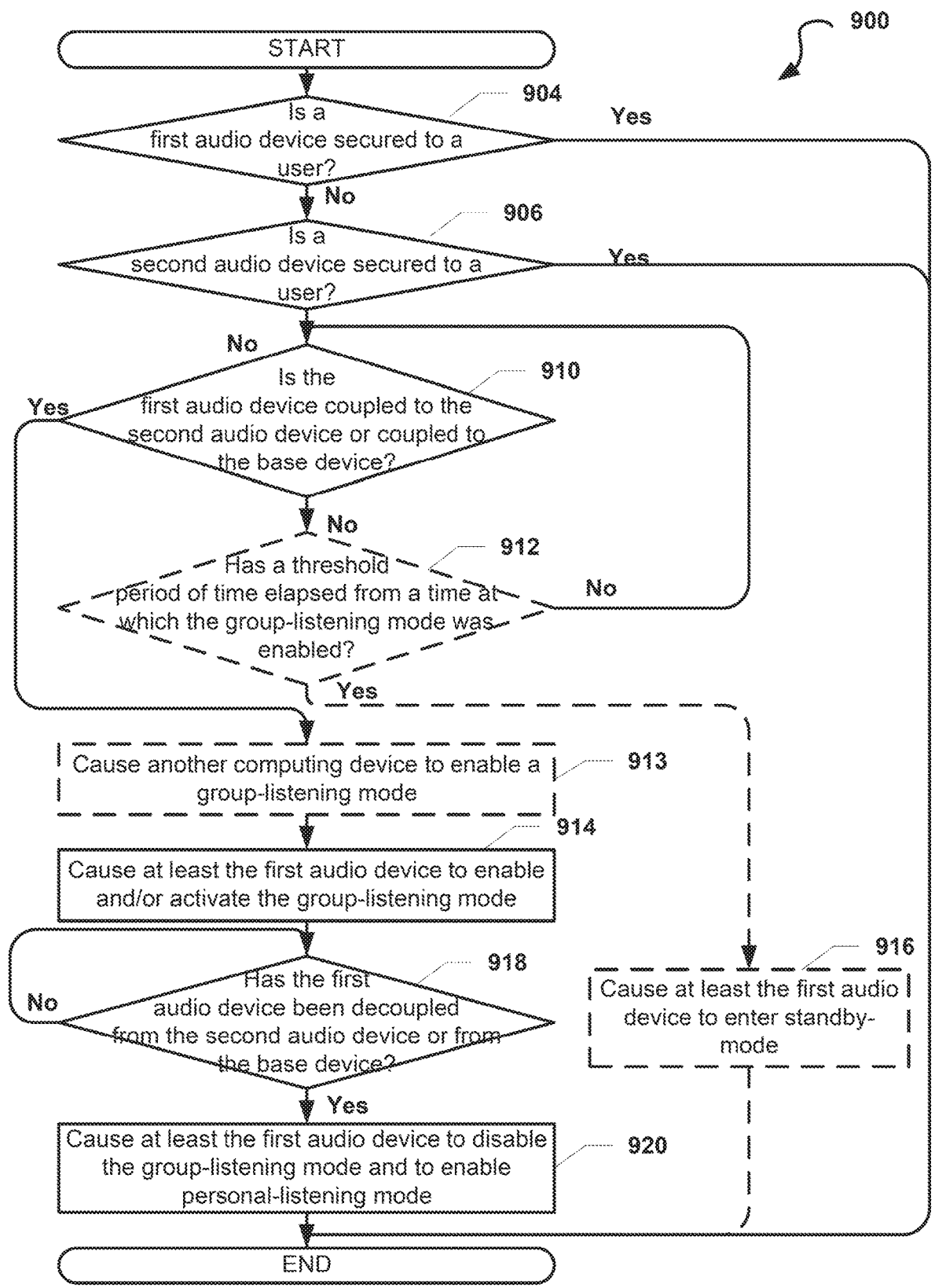
FIG. 9 is a process flow diagram illustrating an embodiment method for configuring an audio device in an audio system to operate in a group-listening mode or a personal-listening mode, according to some embodiments.

FIG. 9 is a flow diagram of an illustrative method 900 for selectively activating a group-listening mode on an audio device. In some embodiments, the method 900 may be implemented by a speaker control service operating on an audio device (e.g., the speaker control service 166 operating on the first audio device 102a, as described with reference to FIG. 1B). As described, the first audio device 102a and the second audio device 102b may be configured to play out audio at higher volumes while configured in a group-listening configuration than while configured in a personal-listening configuration. In order to prevent damage to a user's hearing, the speaker control service 166 may determine whether a user is wearing the first audio device 102a and/or the second audio device 102b before configuring or causing the first audio device 102a and the second audio device 102b to output sound in a group-listening mode. Accordingly, the speaker control service 166 of the first audio device 102a (and/or the second audio device 102b) may perform the following operations of the method 900.

The speaker control service 166 may begin performing the operations of the method 900 by determining whether the first audio device 102a is secured to a user, in determination block 904. In some embodiments, the first audio device 102a may include one or more sensors (e.g., the one or more sensors 150 as described with reference to FIGS. 1B and 4A) that may be configured to detect that the first audio device 102a is worn or not worn by a user. For example, the sensors may include pressure sensors, light-intensity sensors, temperature sensors, accelerometers, or the like, and the speaker control service 166 may utilize data from these sensors to determine whether the first audio device 102a is secured to the user.

In response to determining that the first audio device 102a is not secured to the user (i.e., determination block 904="NO"), the speaker control service 166 may determine whether the second audio device 102b is secured to the user, in determination block 906. In some embodiments, the speaker control service 166 may send a request to the second audio device 102b via a wireless communication. The request may cause the second audio device 102b to determine whether the second audio device 102b is secured to a user, such as by utilizing one or more sensors available on the second audio device 102b that may be similar to the sensors described above. The first audio device 102a may then receive this determination from the second audio device 102b in response to the request. Alternatively (or additionally), the request may cause the second audio device 102b to provide the first audio device 102a with information that is similar to the information determined by the first audio device 102a in determination block 904. In such embodiments, the information received by the first audio device 102a from the second audio device 102b may include sensor information or other data that may enable the speaker control service 166 to determine whether the second audio device 102b is secured to a user.

In response to determining that the first audio device 102a is secured to the user (i.e., determination block 904) or in response to determining that the second audio device 102b is secured to the user (i.e., determination block 906="YES"), the speaker control service 166 may cease performing the operations of the method 900. Specifically, because either the first audio device 102a is secured to the user or the second audio device 102b is secured to the user, the speaker control service 166 may cause the personal-listening mode to remain enabled and the group-listening mode to remain disabled. In some embodiments (not shown), the speaker control service 166 may repeat the operations of the method 900 continually while the first audio device 102a is active (e.g., while not in a standby mode or turned off).

In response to determining that the second audio device 102b is not secured to the user (i.e., determination block 906="NO"), the speaker control service 166 may determine whether the first audio device 102a is coupled to the second audio device 102b or, alternatively, coupled to the base device 103, in determination block 910. As described, the first audio device 102a may be configured to couple to the second audio device 102b and/or the base device 103 via one or more coupling devices (e.g., the coupling devices 220a-220c as described above with reference to at least FIGS. 2A, 4, and 8A). For example, the coupling devices 220a-220c of the first audio device 102a may be or include magnetic elements configured to engage corresponding coupling devices on the second audio device 102b and/or the base device 103. Thus, in some embodiments, the speaker control service 166 may be configured to determine whether the first audio device 102a is magnetically coupled to either the second audio device 102b or the base device 103, such as via a Hall-Effect sensor, reed switch, or similar sensor. In some alternative (or additional) embodiments, the sensors on the first audio device 102a are configured to detect whether the first audio device 102a is secured to the user may be the same or different than sensors that detect whether the first audio device 102a is secured to the second audio device 102b and/or the base device 103.

In response to determining that the first audio device 102a is not coupled to the second audio device 102b and is not coupled to the base device 103 (i.e., determination block 910="NO"), the speaker control service 166 may optionally determine whether a threshold amount of time has elapsed since the first audio device 102a was activated (e.g., put into an active/high-power mode from a standby/low-power mode or from a powered-off mode) and/or from a time at which the first audio device 102a was detached from a user, in optional determination block 912. For example, the speaker control service 166 may determine whether thirty seconds has elapsed from a time at which the speaker control service 166 first detected that the first audio device 102a and the second audio device 102b were no longer secured to the user.

In response to determining that a threshold period of time has not elapsed (i.e., determination block 912="NO"), the speaker control service 166 may repeat the above operations in a loop by again determining whether the first audio device 102a is coupled to the second audio device 102b or to the base device 103, in determination block 910. In response to determining that a threshold period of time has elapsed (i.e., determination block 912="YES"), the speaker control service 166 may optionally cause at least the first audio device 102a to enter a standby mode in which the first audio device 102a is placed into a low- or lower-power state in comparison to a high-power or "active" mode that may be the mode in which the first audio device 102a operates during normal operations (e.g., during audio playback). The speaker control service 166 may then cease performing the operations of the method 900.

In response to determining that the first audio device 102a is coupled to the second audio device 102b or coupled to the base device 103 (i.e., determination block 910="YES"), the speaker control service 166 may optionally cause another computing device to enable group-listening mode, in optional block 913. In some embodiments, the speaker control service 166 may perform the operations of optional block 913 by causing an option to activate the group-listening mode to become available on a user interface of a computing device in communication with the first audio device 102a and the second audio device 102b. For example, the speaker control service 166 may cause an application operating on a user's mobile computing device (e.g., the mobile computing device 106 describe with reference to FIG. 1A) to show that the group-listening mode is available to be turned on, such as by sending a signal to the user's mobile computing device indicating that the first audio device 102a and the second audio device 102b are not secured to the user's head and that at least the first audio device 102a is coupled to the second audio device 102b or to the base device 103.

In block 914, the speaker control service 166 may cause at least the first audio device 102a to enable group-listening mode on the first audio device 102a and, optionally, may also cause the second audio device 102b to enable group-listening mode. In some embodiments, the speaker control service 166 may enable a group-listening mode on the first audio device 102a by activating the second speaker 214a and/or by configuring the first speaker 212a to transition from operating as a personal-listening speaker to operating as a group-listening speaker. The speaker control service 166 may cause the second audio device 102b to enable group-listening mode by sending a message to the second audio device 102b (e.g., via a wireless communication link), which may cause the second audio device 102b to activate the second speaker 214b and/or to reconfigure the first speaker 212b as a group-listening speaker.

In determination block 918, the speaker control service 166 may determine whether the first audio device 102a has been decoupled from the second audio device 102b or decoupled from the base device 103. In some embodiments, in response to determining that the first audio device 102a has not been decoupled from the second audio device 102b or from the base device 103 (i.e., determination block 918="NO"), the speaker control service 166 may repeat the operation in determination block 918. However, in response to determining that the first audio device 102a has been decoupled from the second audio device 102b or from the base device 103 (i.e., determination block 918="YES"), the speaker control service 166 may configure or cause the speaker (or speakers) of the first audio device 102a to transition from a group-listening mode to a personal-listening mode, in block 920. For example, the speaker control service 166 may cause the first speaker 212a to transition from operating as a group-listening speaker to operating as a personal-listening speaker. Additionally (or alternatively), the speaker control service 166 may cause the second speaker 214a to become disabled. Optionally, the first audio device 102 may cause the second audio device 102b to similarly disable the group-listening mode and to enable the personal-listening mode (e.g., through a command sent from the first audio device 102a to the second audio device 102b or by causing the base device 103 to send the second audio device 102b such a command). The speaker control service 166 may then cease performing the operations of the method 900.

While the operations of the method 900 are described above as being performed by the first audio device 102a (e.g., by the speaker control service 166 operating on the first audio device 102a), in some embodiments, the second audio device 102b, the base device 103, and/or another computing device in communication with the first audio device 102a and the second audio device 102b (e.g., the mobile computing device 105 as described with reference to FIG. 1A) may perform one or more of the operations of the method 900. For example, the base device 103 may determine whether the first audio device 102a and the second audio device 102b are secured to the user in determination block 904 and 906 by requesting sensor information from the devices 102a, 102b (e.g., sensor information related to or determinations made by the devices 102a, 102b regarding whether those devices 102a, 102b are secured to the user). In another example, a speaker control service operating on the second audio device 102b may perform one or more of the above operations to determine whether to enable or cause to be enabled a group-listening mode and/or a personal-listening mode on the second audio device 102b and/or the first audio device 102a.

In the above descriptions, audio devices are referred to as a "first" audio device and as a "second" audio device. Such references are merely for ease of reference and do not limit an audio device to being solely a "first" audio device or a "second" audio device. Similarly, in some embodiments, speakers are referred to as a "first" speaker and as a "second" speaker. Such references are merely for ease of reference and do not limit a speaker device to being solely a "first" speaker or a "second" speaker.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A computer-implemented method implemented on a first audio device usable in conjunction with a second audio device, comprising:
    determining that the first audio device is not secured to a user;
    determining that the second audio device is not secured to the user;
    determining that the first audio device is coupled to one of the second audio device or a base device; and
    based on each determining, causing at least the first audio device to enable a group-listening mode,
    wherein determining that the second audio device is not secured to the user comprises:

sending a communication to the second audio device requesting information regarding whether the second audio device is secured to the user;
obtaining the information; and
determining that the second audio device is not secured to the user based on the information.

2. The computer-implemented method of claim 1, wherein the information comprises sensor information obtained by one or more sensors included on the second audio device.

3. The computer-implemented method of claim 1, wherein the information comprises a determination that the second audio device is not coupled to the user.

4. The computer-implemented method of claim 1, further comprising:
determining that the first audio device has been decoupled from one of the second audio device or the base device; and
based on determining that the first audio device has been decoupled from one of the second audio device or the base device, causing the first audio device to disable the group-listening mode.

5. The computer-implemented method of claim 1, further comprising causing a computing device to enable a group-listening mode on the computing device in response to determining that the first audio device is coupled to one of the second audio device or the base device.

6. The computer-implemented method of claim 1, further comprising:
determining that the first audio device is no longer coupled to one of the second audio device or the base device;
determining that a threshold period of time has elapsed from a time at which a group-listening mode was enabled on the first audio device; and
based on determining that the first audio device is no longer coupled to one of the second audio device or the base device and determining that the threshold period of time has elapsed from the time at which the group-listening mode was enabled on the first audio device, causing the first audio device to transition from an active mode to a standby mode.

7. The computer-implemented method of claim 1, wherein causing at least the first audio device to enable a group-listening mode comprises causing a group-listening speaker to activate.

8. The computer-implemented method of claim 1, wherein causing at least the first audio device to enable a group-listening mode comprises causing a speaker to transition from a personal-listening mode to a group-listening mode.

9. A first audio device comprising:
a memory configured to store processor-executable instructions; and
a processor in communication with the memory and configured to execute the processor-executable instructions to perform operations comprising:
determining that the first audio device is not secured to a user;
determining that a second audio device is not secured to the user;
determining that the first audio device is coupled to one of the second audio device or a base device; and
based on each determining, causing at least the first audio device to enable a group-listening mode,
wherein determining that the second audio device is not secured to the user comprises:

sending a communication to the second audio device requesting information regarding whether the second audio device is secured to the user;
obtaining the information; and
determining that the second audio device is not secured to the user based on the information.

10. The first audio device of claim 9, wherein the information comprises sensor information obtained by one or more sensors included on the second audio device.

11. The first audio device of claim 9, wherein the information comprises a determination that the second audio device is not coupled to the user.

12. The first audio device of claim 9, wherein the processor is configured to execute the processor-executable instructions to perform operations further comprising:
determining that the first audio device has been decoupled from one of the second audio device or the base device; and
causing the first audio device to disable the group-listening mode.

13. The first audio device of claim 9, wherein the processor is configured to execute the processor-executable instructions to perform operations further comprising causing a computing device to enable a group-listening mode on the computing device in response to determining that the first audio device is coupled to one of the second audio device or the base device.

14. The first audio device of claim 9, wherein the processor is configured to execute the processor-executable instructions to perform operations further comprising:
determining that the first audio device is no longer coupled to one of the second audio device or the base device;
determining that a threshold period of time has elapsed from a time at which a group-listening mode was enabled on the first audio device; and
causing the first audio device to transition from an active mode to a standby mode.

15. The first audio device of claim 9, wherein the processor is configured to execute the processor-executable instructions to perform operations such that causing at least the first audio device to enable a group-listening mode comprises causing a group-listening speaker to activate.

16. The first audio device of claim 9, wherein the processor is configured to execute the processor-executable instructions to perform operations such that causing at least the first audio device to enable a group-listening mode comprises causing a speaker to transition from a personal-listening mode to a group-listening mode.

17. A system comprising:
a first audio device;
a second audio device; and
a computing device,
wherein:
the first audio device comprises:
a memory configured to store processor-executable instructions; and
a processor in communication with the memory and configured to execute the processor-executable instructions to perform operations comprising:
determining that the first audio device is not secured to a user;
determining that a second audio device is not secured to the user;
determining that the first audio device is coupled to one of the second audio device or a base device;

causing at least the first audio device to enable a group-listening mode; and causing the computing device to enable a group-listening mode on the computing device in response to determining that the first audio device is coupled to one of the second audio device or the base device.

\* \* \* \* \*